US009481246B2

(12) United States Patent
Kim et al.

(10) Patent No.: US 9,481,246 B2
(45) Date of Patent: Nov. 1, 2016

(54) VEHICLE CONTROL APPARATUS AND METHOD THEREOF

(71) Applicant: LG ELECTRONICS INC., Seoul (KR)

(72) Inventors: Seonghwan Kim, Seoul (KR); Hyunsun Lyu, Seoul (KR); Minah Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/681,640

(22) Filed: Apr. 8, 2015

(65) Prior Publication Data

US 2015/0291032 A1    Oct. 15, 2015

(30) Foreign Application Priority Data

Apr. 10, 2014  (KR) .................. 10-2014-0043051

(51) Int. Cl.
| | |
|---|---|
| *B60K 35/00* | (2006.01) |
| *G06F 3/0488* | (2013.01) |
| *B62D 1/04* | (2006.01) |
| *B60R 25/00* | (2013.01) |
| *B60K 37/06* | (2006.01) |

(52) U.S. Cl.
CPC .............. *B60K 35/00* (2013.01); *B60K 37/06* (2013.01); *B60R 25/007* (2013.01); *B62D 1/04* (2013.01); *G06F 3/04883* (2013.01); *B60K 2350/1004* (2013.01); *B60K 2350/106* (2013.01); *B60K 2350/1028* (2013.01); *B60K 2350/1052* (2013.01); *B60K 2350/901* (2013.01); *B60K 2350/928* (2013.01)

(58) Field of Classification Search
CPC .................. B60K 35/00; B60K 37/06; B60K 2350/1052; B60K 2350/901; B60K 2350/1028; B60K 2350/928; B60K 2350/106; B60K 2350/1004; B62D 1/04; B60R 25/007; B60R 1/00
See application file for complete search history.

(56) References Cited

U.S. PATENT DOCUMENTS

| 8,406,961 B2 * | 3/2013 | Pathak ................ G06F 3/03547 340/438 |
| 2005/0110769 A1 * | 5/2005 | DaCosta ............... G06F 3/0418 345/173 |

(Continued)

FOREIGN PATENT DOCUMENTS

| DE | 102009038333 A1 * | 2/2011 |
| GB | 2470264 | 11/2010 |

(Continued)

OTHER PUBLICATIONS

Korean Office Action dated Jan. 26, 2015 for Korean Application No. 10-2014-0043051, 4 Pages.

(Continued)

*Primary Examiner* — Michael J Zanelli
(74) *Attorney, Agent, or Firm* — Fish & Richardson P.C.

(57) ABSTRACT

The present disclosure relates to a vehicle control apparatus and a control method thereof, and the vehicle control apparatus may include a body portion comprising an outer frame constituting an external appearance of a vehicle and an inner frame formed to allow a user to get on, a sensing unit configured to sense a user's input from at least one sensing region formed on the body portion, and a controller configured to drive at least one of functions that can be executed in the vehicle based on at least one of a location of the sensing region at which the user's input is sensed and the user's input to the sensing region.

20 Claims, 12 Drawing Sheets

(56) References Cited

U.S. PATENT DOCUMENTS

| | | | | |
|---|---|---|---|---|
| 2006/0047386 | A1* | 3/2006 | Kanevsky | B60K 35/00 701/36 |
| 2008/0048930 | A1* | 2/2008 | Breed | B60N 2/002 345/7 |
| 2010/0188343 | A1* | 7/2010 | Bach | B60K 37/06 345/173 |
| 2010/0288567 | A1* | 11/2010 | Bonne | B60K 37/06 178/18.01 |
| 2011/0040455 | A1* | 2/2011 | Lathrop | B60K 35/00 701/48 |
| 2011/0169750 | A1* | 7/2011 | Pivonka | B60K 35/00 345/173 |
| 2012/0191267 | A1 | 7/2012 | Ogawa | |
| 2012/0232751 | A1* | 9/2012 | Guspan | B62D 1/046 701/36 |
| 2013/0050114 | A1* | 2/2013 | Backman | B60K 37/06 345/173 |
| 2013/0106693 | A1* | 5/2013 | Okuyama | G06F 3/0482 345/157 |
| 2013/0135033 | A1* | 5/2013 | Fukushima | H03K 17/96 327/517 |
| 2013/0147729 | A1* | 6/2013 | Lim | G06F 3/0482 345/173 |
| 2014/0281964 | A1* | 9/2014 | Han | G06F 3/016 715/708 |
| 2015/0158388 | A1* | 6/2015 | Kalbus | B60K 35/00 701/36 |
| 2015/0253922 | A1* | 9/2015 | Goodlein | G06F 3/0488 345/173 |

FOREIGN PATENT DOCUMENTS

| | | | |
|---|---|---|---|
| JP | 2003-341447 | * | 12/2003 |
| JP | 2009-057013 | A | 3/2009 |
| JP | 2012-150714 | A | 8/2012 |
| KR | 10-1998-0051915 | A | 9/1998 |
| KR | 10-2011-0080985 | A | 7/2011 |

OTHER PUBLICATIONS

Korean Notice of Allowance dated Jul. 21, 2015 for Korean Application No. 10-2014-0043051, 2 pages.
Extended European Search Report issued in European Application No. 15000997.5 on May 13, 2016, 7 pages.

* cited by examiner

VEHICLE CONTROL APPARATUS AND METHOD THEREOF

CROSS-REFERENCE TO RELATED APPLICATION

Pursuant to 35 U.S.C. §119(a), this application claims the benefit of earlier filing date and right of priority to Korean Application No. 10-2014-0043051, filed in Republic of Korea on Apr. 10, 2014, the contents of which is incorporated by reference herein in its entirety.

BACKGROUND OF THE DISCLOSURE

1. Field of the Invention

The present disclosure relates to a vehicle control apparatus and a control method thereof.

2. Background of the Disclosure

A recent vehicle control technique provides a lot of functions unlike the conventional one. For instance, a recent vehicle control apparatus may control a vehicle door to be open, or may control a vehicle to start, using a fingerprint authentication method rather than the conventional key method. Alternatively, the vehicle control apparatus may control a height of a driver's seat, an angle of a back of a seat, etc. according to a driver's request, thereby providing a more comfortable and pleasant driving environment.

Research on a method capable of driving a vehicle by a user more easily and conveniently, and capable of providing a user's preferred driving environment using such vehicle control system is being actively ongoing.

SUMMARY OF THE DISCLOSURE

Therefore, an aspect of the detailed description is to provide a vehicle control apparatus capable of allowing a user to generate his or her preferred driving environments in a more easy and convenient manner, and a control method thereof.

In order to accomplish the foregoing and other objects, according to an aspect of the present disclosure, a vehicle control apparatus according to an embodiment of the present disclosure may include a body portion comprising an outer frame constituting an external appearance of a vehicle and an inner frame formed to allow a user to get on, a steering wheel mounted in the body portion, and formed to be rotatable by a central axis to control the movement direction of the vehicle, a sensing unit configured to sense a user's input from the at least one sensing region, and a controller configured to drive at least one of functions that can be executed in the vehicle based on at least one of a location of the sensing region at which the user's input is sensed and the user's input to the sensing region.

According to an embodiment, the controller may determine whether or not to activate the at least one sensing region based on preset deactivation conditions, respectively, according to the location and characteristic of the at least one sensing region.

According to an embodiment, the controller may deactivate sensing regions formed at least part of the steering wheel when a rotation angle of the steering wheel is greater than a preset threshold angle.

According to an embodiment, the steering wheel may include a circular rotation portion surrounding a central portion thereof to be rotated by a user's both hands, and sensing regions formed on the steering wheel may be formed in one region of the rotation portion to face each other.

According to an embodiment, the sensing regions may further include a touch sensor configured to sense a plurality of knocks applied by a user, respectively, or a user's touch and drawing input, and the controller may perform a preset function based on a user's input applied to the each touch sensor.

According to an embodiment, the sensing unit may further include an output unit configured to output notification information, and the controller may control the output unit to change an output of the notification information based on an inactive state of the sensing region.

According to an embodiment, the output unit may further include a display unit configured to display visual information, and the controller may control the display unit to limit the display of the visual information when the sensing region is switched to an inactive state.

According to an embodiment, the vehicle control apparatus may further include a display unit configured to display visual information, wherein the at least one sensing region corresponds to a menu screen containing items associated with at least one function that can be executed in the vehicle, respectively, and the controller displays a menu screen corresponding to a sensing region on which a user's input is sensed among the at least one sensing region on the display unit.

According to an embodiment, the menu screen may include an item associated with functions for controlling a physical environment setting of the vehicle or may include items associated with functions for controlling a software environment setting of the vehicle.

According to an embodiment, the controller may change a size of the visual information displayed on the display unit based on the direction and length of trajectories formed by the user's touch-and-drag inputs entered to the at least two sensing regions at the same time.

According to an embodiment, the controller may reduce the size of visual information displayed on the display unit based on at least one length of the trajectories when the trajectories of the touch-and-drag inputs are formed in a direction of being closer to each other, and enlarge the size of visual information displayed on the display unit based on at least one length of the trajectories when the trajectories of the touch-and-drag inputs are formed in a direction of being away from each other.

According to an embodiment, the display unit may be implemented in the form of a transparent display on at least part of a windshield glass of the vehicle.

According to an embodiment, the vehicle control apparatus may further include a driving state determination unit for determining a driving state of the vehicle, wherein the controller determines a sensitivity for sensing a user's input in the sensing region based on the determined driving state of the vehicle.

According to an embodiment, the driving state determination unit may determine a current driving state of the vehicle based on at least one of a current vibration generated from the vehicle, a current location of the vehicle and a current speed of the vehicle.

According to an embodiment, the controller may authenticate a user based on the user's input applied to the at least one sensing region, and switch the status of the vehicle to a lock-released state or locked state.

According to an embodiment, the controller may perform a user's authentication based on a result of matching information that has recognized a pattern formed with a plurality of taps applied to the at least one sensing region by the user or information received from the user's body with prestored authentication information.

In order to accomplish the foregoing other objects, according to an aspect of the present disclosure, a control method of a vehicle control apparatus according to an embodiment of the present disclosure may include sensing a user's input from one or more sensing regions formed on a body portion comprising an outer frame and an inner frame of a vehicle, selecting at least one of functions that can be executed in the vehicle based on a location of the sensing region at which the user's input is sensed and a user's input applied to the sensing region, and driving the selected at least one function.

According to an embodiment, said sensing a user's input may further include activating a region in which the user's input is sensed among the at least one sensing region, checking a deactivation condition according to at least one of a location of the activated sensing region and a characteristic of the corresponding function of the vehicle, and sensing whether or not the deactivation condition is satisfied, and deactivating the activated sensing region based on the sensed result.

According to an embodiment, said deactivating step may further include displaying information associated with the deactivated sensing region.

According to an embodiment, said activating a sensing region may further include sensing a current driving state of the vehicle, and determining a sensitivity of the activated sensing region based on the sensed driving state.

The effect of a vehicle control apparatus and a control method thereof according to the present disclosure will be described as follows.

According to at least one of the embodiments of the present disclosure, the present disclosure may allow only an authenticated user to use a vehicle using the user's unique authentication information, thereby having an advantage in which the user does not need to possess his or her key, as well as effectively preventing the risk of theft of the vehicle.

Furthermore, according to at least one of the embodiments of the present disclosure, the present disclosure may control various environment setting states of the vehicle with only a simple touch input, thereby having an advantage in which the user can change various environment settings of the vehicle in a more easy and convenient manner.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
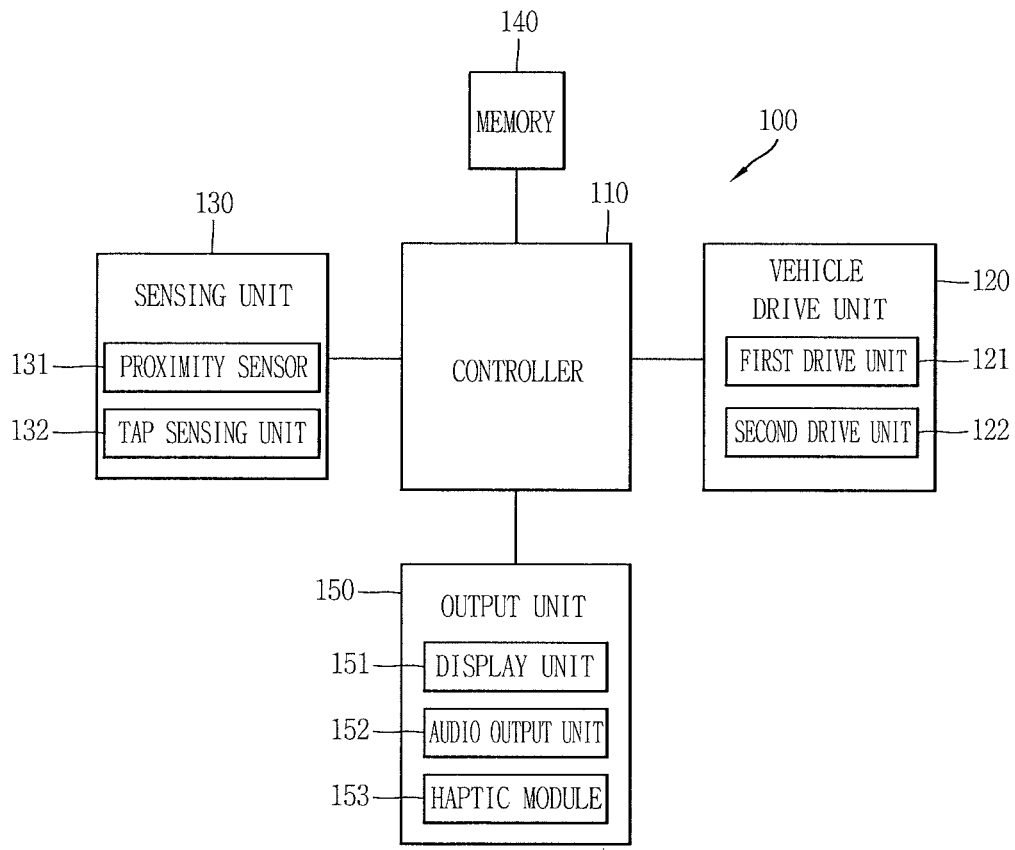
FIG. 1 is a block diagram for explaining a vehicle control apparatus associated with the present disclosure.

FIG. 1 is a block diagram for describing the vehicle control apparatus associated with the present invention.

First, as illustrated in FIG. 1, a vehicle control apparatus 100, disclosed in the present specification, according to one embodiment, is configured to include a controller 110, a sensing unit 130 connected to the controller 110, a vehicle drive unit 120, and a memory 140. The vehicle control apparatus 100 may further include an output unit 150. Then, the vehicle control apparatus 100 is formed in a body of a vehicle that is configured to include an external frame that makes up an external appearance of the vehicle, a window, and an internal frame which is formed in such a manner that the user rides in. At this point, the constituent elements illustrated in 1 are not essential in realizing the vehicle control apparatus 100 according to the present invention, and thus the vehicle control apparatus 100 described in the present specification may include one or more constituent elements in addition to the constituent elements described above and may omit one or more constituent elements.

The sensing unit 130 is typically implemented using one or more sensors configured to sense internal information of the vehicle control apparatus 100, the surrounding environment of the vehicle control apparatus 100, user information, and the like. For example, the sensing unit 130 is shown having a proximity sensor 131 and an illumination sensor. If desired, the sensing unit 130 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor, a microphone 122, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The vehicle control apparatus 100 may be configured to utilize information obtained from sensing unit 130, and in particular, information obtained from one or more sensors of the sensing unit 130, and combinations thereof.

Furthermore, the sensing unit 130 may include at least one sensing region for sensing a user's input, and the sensing region may be formed on a body portion of the vehicle including an outer frame and an inner frame of the vehicle. Such a sensing region may be implemented as a touch pad, or the like.

The sensing region may be formed at various portions of the vehicle. For instance, the sensing region may be implemented on an entire or partial region of a wind shield glass of the vehicle or implemented at a driver's seat side window, a passenger seat side window, an external surface of the vehicle rear seat window (a surface exposed to an outside of the vehicle), or an internal surface of the vehicle rear seat window (a surface toward an inside of the vehicle). Otherwise, the sensing region may be implemented on a side mirror of the vehicle or a sunroof of the vehicle.

Furthermore, the sensing region may be implemented in various regions as well as at a portion formed with a glass such as a window or sunroof of the vehicle. For example, the touch screen may be implemented on an external frame surface of the vehicle, such as between a wind shield glass and a window, on a window or between windows, like an A-pillar, a B-pillar and a C-pillar. Otherwise, the touch screen may be implemented in at least part of an external surface of the vehicle door. In addition, at least one or more touch screens may be formed on a plurality of different portions of the vehicle.

More preferably, the sensing region may be formed on at least one portion of a steering handle of the vehicle, or formed on an upper surface of a gear box or an upper surface of a console box.

On the other hand, the sensing unit 130 may further include a short-range communication module (not shown). The short-range communication module 131 for short-range communication may support short-range communication using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, Wireless Universal Serial Bus (Wireless USB). The short-range communication module may support wireless communication between the vehicle control apparatus 100 and a specific external device through wireless area networks.

The vehicle drive unit 120 changes various settings and enables a function to be automatically performed. For example, the vehicle drive unit 120 controls each constituent element of the vehicle under the control of the controller 110, for example, controls the extent to which a window of the front driver seat or the front passenger seat is opened or controls an angle of a rear view mirror. The vehicle drive unit 120 adjusts a height or a horizontal position (for example, a distance between the seats) of at least one among the front driver seat or the front passenger seat and the rear seats. The vehicle drive unit 120 may set a steering wheel in the driver seat, for example, may set a height of the steering wheel and a sensitivity of the steering wheel and the like under the control of the controller 110. In addition, under the control of the controller 110, the vehicle drive unit 120 may enable a gear to operate in an automatic transmission or in a manual transmission, and in a case of a hybrid vehicle, may enable any one, among a mode of operation of a combustion engine and a mode of operation of an electric motor mode, to be preferentially selected.

In addition, under the control of the controller 110, the vehicle drive unit 120 may change not only a hardware setting state of the vehicle, but also a software setting state of the vehicle. For example, under the control of the controller 110, the vehicle drive unit 120 may enable a predetermined music play list to be displayed or may enable one music item on the predetermined music play list to be automatically reproduced. In addition, the vehicle drive unit 120 may automatically set a predetermined specific destination point and may enable a path to the specific destination point to be automatically displayed though a navigation apparatus. In addition, under the control of the controller 110, the vehicle drive unit 120 may enable a distance from a preceding or following vehicle or a speed of the vehicle to be automatically set at the time of cruise driving of the vehicle.

To do this, the vehicle drive unit 120 is configured to include different sub-drive units, and the sub-drive units change hardware or software setting states of the vehicle, respectively. The sub-drive unit that changes the hardware setting state of the vehicle is referred to as a first drive unit 121, and the sub-drive unit that changes the software setting state of the vehicle is referred to as a second drive unit 122.

At this point, in order to change the hardware setting of the vehicle, the first drive unit 121 is configured to include different constituent elements that change the external frame or the internal frame of the vehicle. For example, the first drive unit 121 may further include a hardware drive unit for adjusting a height of the seat or an angle of the back of the seat, and may further include a unit for adjusting the height of the steering wheel, which is configured to include an elastic member or a pressure member, such as a coil or a spring for elevating or lowering the height of the steering wheel.

On the other hand, the second drive unit 122 is realized as at least one or more application programs or applications. For example, the second drive unit 122 is realized as being in the form that includes any one among application programs for driving the navigation apparatus or an application program for reproducing already-stored medium data (for example, MP3) and the like. These application programs or applications may be those for one among types of drive control of the vehicle.

Furthermore, the vehicle drive unit 120 cancels a locked state of the vehicle or switches the vehicle to the locked state. At this point, the locked state of the vehicle is a state where one or more of or all of the functions of the vehicle are limited, the vehicle does not start, or a door of the vehicle does not open. As opposed to the locked state, the canceling of the locked state makes the vehicle return to a state where, at least one among a driver seat, a front passenger seat, rear passenger seats, and a trunk can open, all the functions of the vehicle can be performed, that is, the vehicle can start, or various functions, such as a navigation function and a ventilation function, can be performed.

The output unit 150 is for generating an output associated with a sense of sight, an auditory sense, or a tactual sense, and is configured to include at least one among a display unit 151, a sound output unit 152, a haptic module 153, and an optical output unit 154. The touch sensor is configured to be layered into, or is integrally formed into the display unit 151 on which various pieces of image information is displayed, or is integrally formed into the display unit 151, thereby realizing a touch screen. The touch screen functions as a user input unit 123 that provides an input interface between the vehicle control apparatus 100 and the user, and at the same time, provides an output interface between the vehicle control apparatus 100 and the user.

Here, the display unit 151 may be formed at various portions of the vehicle. For instance, the display unit 151 may be implemented on an entire or partial region of a wind shield glass of the vehicle or at a driver's seat side window, a passenger seat side window, a vehicle rear seat window. Otherwise, the display unit 151 may be implemented on a side mirror of the vehicle or a sunroof of the vehicle.

Data available to various functions of the vehicle control apparatus 100 is stored in the memory 140. Multiple application programs or applications that run on the vehicle control apparatus 100, data and commands for the vehicle control apparatus 100 are stored in the memory 140. At least one or more of these application programs are downloaded from an external server over a wireless communication network. In addition, for basic functions (for example, a vehicle starting function, a navigation function, etc.), at least one or more of these application programs are pre-installed on the vehicle control apparatus 100 before shipping. On the other hand, the application program is stored in the memory 140 and is installed on the vehicle control apparatus 100. The controller 100 runs the application program in order that the application program performs operation (or a function) of the vehicle control apparatus.

Pieces of information relating to at least one or more users are stored in the memory 140. At this point, the information relating to the user is authentication information on the user and information relating to various setting conditions of the vehicle that are set by the user himself/herself or are set properly based on the bio-information on the user. The information relating to the user is, for example, setting information relating to indoor temperature or humidity in the vehicle, which is set by the user himself/herself, setting information that depends on a driving habit of the user, or the like. In addition, the information relating to the user may be a record of driving paths along which the user drove. In addition, the authentication information may be information on a password or a pattern that is predetermined by the user, or may be information that is based on the bio-information on the user, such as recognition information on user's fingerprints or irises. In addition, the authentication information may be information relating to a user's gesture.

In addition, a program for operation of the controller 110 is stored in the memory 140, pieces of data, (for example, user authentication information, or driving environment setting information) that are input or output may be temporarily stored in the memory 140. Pieces of data on various patterns of vibration and sound that are output when an touch input is applied to the touch screen are stored in the memory 140.

The memories 140 include storage media, such as a flash memory, a hard disk, a solid state disk (SDD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The vehicle control apparatus 100 may operate in association with a web storage apparatus that, like the memory 140, performs a storage function over the Internet.

On the other hand, the controller 110 normally controls entire operation of the vehicle control apparatus 100 in addition to the operation associated with the application programs described above. The controller 110 processes the signal, the data, the information, and the like that are input or output through the constituent elements described above, or controls driving of the vehicle by running the application program that is stored in the memory 140. In addition, the controller 110 controls at least one or more, among the constituent elements that are described referring FIG. 1, in order to run the application program stored in the memory 140. Furthermore, the controller 110 controls the constituent elements that are included in the vehicle control apparatus 100, in combination of at least two or more of them, in order to run the application program.

On the other hand, the user inputs the authentication information into the controller 110, and the controller 110 determines whether or not the user is an authenticated user, based on the authentication information. The authentication information is recognition information on the user's finger or on a predetermined pattern. In addition, the authentication information is recognition information on user's irises, or information relating to a user's specific gesture. For example, pattern recognition information or finger recognition information is input, as the authentication information, into the controller 110. The pattern recognition information is on multiple-times tapping (for example, multiple taps or multiple knocks) that are applied by the user to one portion of the external or internal surface of the vehicle. The finger recognition information is input through one portion of the external or internal surface of the vehicle, or through a touch screen region that is formed on the window and the window shield glass and the like in the driver seat or the passenger seat. In addition, the controller 110 may recognize the user's gesture that is made inside of or outside of the vehicle, or may recognize the iris information on the user, using the photo sensor or the camera that is provided in the sensing unit 130.

Then, the controller 110 cancels the locked state of the vehicle only when the user is an authenticated user. Then, the vehicle control apparatus 100 enables the user to open the door of the vehicle, the trunk, and the like without having to use the key to them. In addition, the controller 110 may make the vehicle start using predetermined authentication information on the user. In addition, the controller 110 may switch the state of the vehicle to the locked state.

That is, based on the selection by the authenticated user, the controller 110 may maintain the locked state of the vehicle until the authentication information on the authenticated user is input again. On the other hand, when the authentication information on the user is input from outside of the vehicle in the state where the vehicle is unlocked, based on this, the controller 110 switches the state of the vehicle to the locked state. Then, when the same authentication information is input again in a state where the vehicle is switched to the locked state, the vehicle may be switched back to the unlocked state.

On the other hand, information on user's fingers or information on the user-set pattern is input into the controller 110 through the formed touch screen. Alternatively, a predetermined password may be input into the controller 110. To do this, the controller 110 performs pattern recognition processing that recognizes writing input or picture-drawing input that is applied to the touch screen, as text or an image, respectively. Furthermore, the controller 110 controls one among the constituent elements described above, or a combination of two or more of them in order to realize the vehicle control apparatus 100 according to various embodiments of the present invention, which are described below.

Furthermore, the controller 110 may sense a user's input to the preset sensing region, and perform various functions based on this. For example, the controller 110 may control one operation mode preferred by an authenticated user (e.g., a normal mode or a sports mode) to be selected, by switching an operation mode of a power steering device of a steering wheel. In addition, the controller 110 may switch a gear transmission mode to a manual transmission mode or an automatic transmission mode based on the sensed user's input.

Furthermore, the controller 110 may implement a software setting change as well as a physical setting change based on the sensed user's input. Furthermore, the controller 110 may select a specific music or specific music list based on the sensed user's input. Otherwise, the controller 110 may select a channel of a specific radio broadcasting station based on the sensed user's input. Otherwise, the controller 110 may immediately select a specific destination based on the sensed user's input, and allow a route for the selected destination to be displayed on the display unit 151 through navigation.

Furthermore, the controller 110 may display various image information on the display unit 151 based on the sensed user's input. For example, the controller 110 may display a user's authentication result, information associated with a currently authenticated user or the like. Otherwise, the controller 110 may display a menu screen capable of selecting at least one of functions that can be executed in the vehicle control apparatus 100 based on a user's input to a currently activated sensing region and/or the sensing region among the at least one sensing region. Furthermore, the controller 110 may select at least one function based on the user's input to perform the selected function.

At this point, one among the executable functions is a function of an application that is installed on the vehicle control apparatus 100. Then, "an arbitrary function is executed" means "an arbitrary application program is executed or is run on the vehicle control apparatus 100." For example, based on the user's multiple taps that are sensed in the console box, the controller 110 reproduces a music file or controls the navigation apparatus in such a manner that a path to a predetermined destination point is automatically set.

As another example, a function that is executable in the vehicle control apparatus 100 is a function that is necessary for basic driving of the vehicle control apparatus 100. For example, the function necessary for the basic driving is a function of turning on/off an air conditioner or a warm-air circulator provided in the vehicle, a function of starting the vehicle, a function of switching between the locked state and the unlocked state, or the like. In addition, the function necessary for the basic driving is a function of turning a cruise control function of the vehicle on or off.

Then, when the user is an authenticated user, the controller 110 changes the setting state of the vehicle using the user-related information that corresponds to the corresponding user. For example, by controlling the first drive unit 121, the controller 110 adjusts the height of the driver seat or the like, the angle of the back of the seat, or the like and may adjust the indoor temperature or humidity in the vehicle, based on the authenticated information on the user. In addition, based on information that corresponds to the authenticated user, the controller 110 adjusts the extent to which the window of the driver seat and the front passenger seat are opened or controls the angle of the rear view mirror and the like. The controller 110 may adjust the height of the steering wheel and the like.

On the other hand, the controller 110 changes the hardware or software setting state, based on the user's gesture. For example, the controller 110 makes it possible for a camera, a photo sensor, a laser sensor, or an infrared sensor to sense movements of the driver or the passenger who rides in the vehicle. Then, based on the movements of the driver and the passenger, the controller 110 may perform a specific function and adjust a currently-set state. As one example, if the passenger sitting on the front passenger seat make a hand-lowering gesture toward the window in the front passenger seat, the extent to which the window in the front passenger seat is opened is adjusted based on the passenger's gesture. In addition, if a specific gesture (for example, a fingers-flicking gesture or a hands-clapping gesture) is sensed, the controller 110 may reproduce predetermined specific music data, based on the driver's or passenger's gesture.

On the other hand, at least one or more among the constituent elements described above, operate in cooperation with one another to realize operation or control of the vehicle control apparatus 100, or a method of controlling the vehicle control apparatus 100, which are described above, according to various embodiments. In addition, the operation or the control of the vehicle control apparatus 100, or the method of controlling the vehicle control apparatus 100 is realized on the vehicle control apparatus 100 by running at least one application program that is stored in the memory 140.

The constituent elements enumerated above are described in more detail below referring to FIG. 1, before describing the vehicle control apparatus 100 according to the various embodiments.

The sensing unit 130 senses at least one among information on the inside of the vehicle control apparatus, information on an surrounding environment of the vehicle control apparatus, and information on the user, and generates a sensing signal corresponding to the sensed information. Based on the sensing signal, the controller 110 controls driving of or operation of the vehicle control apparatus 100, or performs data processing, a function, or an operation associated with the application program that is stored on the vehicle control apparatus 100. Typical sensors among various sensors that can be included in the sensing unit 130 are described in more detail.

First, the proximity sensor 131 may include a sensor to sense presence or absence of an object approaching a surface, or an object located near a surface, by using an electromagnetic field, infrared rays, or the like without a mechanical contact. The proximity sensor 131 may be arranged at an inner region of the mobile terminal covered by the touch screen, or near the touch screen.

The proximity sensor 131, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 131 can sense proximity of a pointer relative to the touch screen by changes of an electromagnetic field, which is responsive to an approach of an object with conductivity. In this case, the touch screen (touch sensor) may also be categorized as a proximity sensor.

On the other hand, for the sake of convenience of explanation, the term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 131 senses a proximity touch and a proximity touch pattern (for example, a proximity touch distance, a proximity touch direction, a proximity touch speed, proximity touch time, a proximity touch position, a proximity touch movement state, and the like). On the other hand, the controller 110 processes data (or information) that corresponds to the proximity touch operation and the proximity touch pattern that are sensed through the proximity sensor 131, and further outputs visual information that corresponds to the processed data, on the touch screen. Furthermore, the controller 110 may control the vehicle control apparatus 100 in such a manner that different operations are performed or different pieces of data (or different pieces of information) are processed depending on whether the touch applied to the same point on the touch screen is a proximity touch or a contact touch.

A touch sensor can sense a touch applied to the sensing region using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 110. Accordingly, the controller 110 may sense which region of the display unit 151 has been touched. Here, the touch controller may be a component separate from the controller 110, the controller 110, and combinations thereof.

On the other hand, the controller 110 may execute the same or different controls according to a type of touch object that touches the sensing region. Whether to execute the same or different control according to the object which provides a touch input may be decided based on a current operating state of the vehicle control apparatus 100 or a currently executed application program, for example.

On the other hand, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The controller 110, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

On the other hand, the sensing unit 130 typically includes at least one a camera sensor (CCD, CMOS etc.), a photo sensor (or image sensors), and a laser sensor.

Implementing a camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 may display various image information. For example, the display unit 151 may display image information associated with various control functions of the vehicle that can be executed in the vehicle control apparatus 100 or display a user authentication result or information associated with a currently authenticated user when user authentication is completed. For example, screen information that is displayed on the display unit 151 that is formed on the internal surface is execution screen information on an application program that is run on the vehicle control apparatus 100, or information on a user interface (UI) and a graphic user interface (GUI) that depend on the execution screen information.

The image information may be displayed on at least part of a windshield glass, a driver seat or passenger seat window or the like in the vehicle, and accordingly, at least part of the window or windshield glass of the vehicle provided with the vehicle control apparatus 100 may be implemented in the form of a transparent glass display.

Audio data that is stored in the memory 140 is output through the sound output unit 152. A sound signal associated with a function (for example, a user authentication confirmation sound and a user authentication guidance sound) that is performed in the vehicle control apparatus 100 may be output through the sound output unit 152. The sound output unit 152 is configured to include a speaker, a buzzer, and the like.

On the other hand, the output unit 150 of the vehicle control apparatus 100, disclosed in the present specification, according to the embodiment, is configured to include the haptic module 153. The haptic module 153 generates various haptic effects that the user can feel. A typical example of the haptic effect that is generated by the haptic module 153 is vibration. If it is sensed that the touch input by the user is applied to the touch screen realized on the external frame of the internal frame of the vehicle, the widow in the form of glass, or the like, the controller 110 outputs haptic information using the haptic module 153. Accordingly, using the haptic information, the user can confirm whether he/she properly input the authentication information.

The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the vehicle control apparatus 100.

On the other hand, various embodiments to be explained later may be implemented in a computer or a computer-readable recording medium, by software, hardware, or a combination thereof.

On the other hand, the sensing unit 130 of the vehicle control apparatus 100, disclosed in the present specification, according to the embodiment may further include a main body that is configured to be mounted on the body and to come into contact with one portion of a user's body, and a tap sensing unit 132 for sensing a tap on the main body or a tap gesture. At this point, the tap that is sensed in the tap sensing unit 132 of the vehicle control apparatus 100 is a means for inputting the authentication information on the user. In addition, if the user rides in the vehicle, the tap is used as a means for controlling various functions of the vehicle control apparatus 100. Then, the tap is construed to mean a motion of lightly hitting the main body of the vehicle control apparatus 100 or an object, with a tapping tool such as a finger, or a motion of lightly bringing the tapping tool into contact with the main body of the vehicle control apparatus 100 or the object. At this point, the main body of the sensing unit 130 is formed on the body of the vehicle that is configured to include the external frame and the internal frame of the vehicle and the window or the windshield glass.

On the other hand, the tapping tool with which the tap is applied is a thing that applies an external force to the main body of the vehicle control apparatus 100 or the object, such as a finger, a stylus pen, a pen, a pointer, and a fist. On the other hand, the tapping tool is not necessarily limited to the thing that can be applied to the vehicle control apparatus 100 according to the present invention, and any type of thing may be possible as long as it can apply the external force to the main body of the vehicle control apparatus 100 or the object.

On the other hand, the objects to which the tap gesture is applied is at least one among the main body of the vehicle control apparatus 100 and the object that is placed on and on the vehicle control apparatus 100.

On the other hand, according to the present disclosure, the tap or the tap gesture is sensed by at least one among an acceleration sensor and a touch sensor that are included in the tap sensing unit 132. At this point, the acceleration sensor is a sensor that is capable of measuring dynamic forces, such as acceleration, vibration, and impact, which are applied to the main body of the vehicle control apparatus 100.

In other words, the acceleration sensor senses vibration (or a movement) of the main body of the vehicle control apparatus 100, which occurs due to the tap gesture, and thus senses whether the tap is applied to the object. Therefore, the acceleration sensor senses the tap on the main body of the vehicle control apparatus 100 or senses that an object that is positioned close to the main body of the vehicle control apparatus 100 to such an extent that it can be sensed whether the movement or the vibration occurs in the main body of the vehicle control apparatus 100 is tapped on.

In this manner, as long as the sensing of the movement or the vibration of the main body of the vehicle control apparatus 100 is possible, the acceleration sensor senses not only the application of the tap to the main body of the vehicle control apparatus 100, but also senses the application of the tap to points other than the main body.

In the vehicle control apparatus 100 according to the present invention, in order to sense the tap on the vehicle control apparatus, only one among the acceleration sensor and the touch sensor is used, the acceleration sensor and the touch sensor are sequentially used, or the acceleration sensor and the touch sensor are used at the same time. On the other hand, a mode in which only the acceleration sensor is used to sense the tap is referred to as a first mode, a mode in which the touch sensor is used to sense the tap is referred to as a second mode, and a mode in which the acceleration sensor and the touch sensor are all utilized (at the same time or sequentially) to sense the tap is referred to as a third mode or a hybrid mode.

On the other hand, if the tap is sensed through the touch sensor, it is possible to more accurately recognize a position at which the tap is sensed.

On the other hand, in the vehicle control apparatus 100 according to one embodiment, in order to sense the tap through the acceleration sensor or the touch sensor, the display unit 151 of the vehicle control apparatus 100 also operates in an inactivated state in a specific mode in which a minimum amount of current or electric power is consumed. The specific mode is referred to as a doze mode.

For example, the dose mode may be a mode maintaining a state in which the acceleration sensor is turned on even while a sensing region that has been previously formed in the vehicle, namely, on at least part of a steering handle is in an inactive state. In addition, the dose mode may be a mode in which the display unit 151 is turned off and the touch sensor and the acceleration sensor are all turned on.

Therefore, in the dose mode, that is, in a state where the display unit 151 is turned off (in a state where the display unit 151 is inactivated), if the user applies the tap to at least one point on the touch screen that is formed on one portion of the vehicle, or to a specific point on the main body of the vehicle control apparatus 100, it is sensed that the tap is applied from the user, through at least one among the touch sensor or the acceleration sensor that is turned on.

In addition, in order to distinguish between a tap as a means for inputting the authentication information on the user or a tap as a means for controlling a function of the vehicle control apparatus 100, and a simple collision of an outside arbitrary object with the touch screen, only if the tap is applied two or more times within a reference time to the touch screen formed on one portion of the vehicle, it is determined that the "tap" is sensed for inputting the authentication information on the user and controlling the vehicle control apparatus 100.

For example, if it is determined that as a result of the sensing by the tap sensing unit 132, the tap is applied one time to the touch screen formed on one portion of the vehicle, the controller 110 may recognize that only the outside arbitrary object or an human body collides with the touch screen, without recognizing that the one-time tap is for inputting the authentication information on the user.

Therefore, only if the tap sensing unit 132 senses that the tap is applied at least two or more times (or multiple times) consecutively within the reference time, it is determined that the "tap" as the means for inputting the authentication information on the user or as the mean of controlling the function of the vehicle control apparatus 100 is sensed.

In other words, the tap gestures mean that the tap gesture is to be sensed at least two or more times consecutively within the reference time. Therefore, the sensing of the "tap" hereinafter means that it is sensed that a user's finger or an object such as a touch pen is lightly hit substantially multiple times on the main body of the main body of the vehicle control apparatus 100.

Furthermore, the controller 110 may make it possible not only to sense the tap within the reference time, but also to determine whether the taps applied using user's different fingers are sensed or the taps applied using one finger of the user's are sensed.

Otherwise, the controller 110 recognizes a position on the display unit 151, at which the taps are sensed, or acceleration that is generated due to the taps, through at least one, among the touch sensor and the acceleration sensor that are provided in the tap sensing unit 132. Thus, the controller 110 makes it possible to sense whether the taps are applied using one finger or using different fingers.

Furthermore, considering additionally an angle at which the tap is applied and a distance between points to which the tap is applied or a direction in which the fingerprint is recognized, the controller 110 determines whether the taps are applied using one finger or using both hands or at least two fingers.

On the other hand, the taps mean multiple-times tapping that are sensed consecutively within the reference time. At this point, the reference time is a very short time, for example, a time in a range of 300 ms to 2 s.

To do this, when the tap sensing unit 132 senses that the main body of the vehicle control apparatus 100 is tapped on, the tap sensing unit 132 senses whether the next tapping is applied consecutively within the reference time after the first tapping is sensed. Then, if the next tapping is sensed within the reference time, the tap sensing unit 132 or the controller 110 determines that the tap is sensed for inputting the authentication information on the user or for controlling a specific function of the vehicle control apparatus 100 according to the embodiment of the present invention. In this manner, only if a second tap is sensed within a predetermined time after a first tap is sensed, the controller 110 recognizes the first and second taps as "effective taps." Thus, the controller distinguishes between the tap that is applied to input the authentication information on the user or to control the vehicle control apparatus 100 and the collision of an object with the inside or outside of the vehicle, which occurs unintentionally or due to a user mistake.

There are various method of recognizing the "effective tap." For example, when it is sensed that the second tap is applied a second reference number of times or greater to the main body within a predetermined time after sensing the first tap that is applied a first reference number of times or greater, the controller 110 may recognizes the first and second taps as the "effective taps." At this point, the first reference number of times and the second reference number of times may be the same or be different. For example, the first reference number of times may be 1, and the second reference number of times may be 2. As another example, the first reference number of times and the second reference number of times may be all 1.

In addition, only if the tap is applied to within a "predetermined region," it is determined that the "taps" are sensed. That is, when it is determined that the main body of the vehicle control apparatus 100 is first tapped on, the controller 110 calculates a predetermined region from a point at which the tapping is first sensed. Then, if the tapping is consecutively sensed the first or second reference number of times or greater at the "predetermined region" within the reference time after the first tapping is sensed, the controller 110 determines that the first tap or the second tap is applied.

On the other hand, of course, the reference time and the predetermined region that are described above can be variably modified according to the embodiment.

On the other hand, of course, the first tap and the second tap may be sensed as a separate tap according to not only the reference time and the predetermined region, but also a position at which each tap is sensed. That is, if the second tap is sensed in a position that is a predetermined distance or above away from the position in which the first tap is sensed, the controller 110 determines that the first tap and the second tap are applied. Then, if the first tap and the second tap are recognized based the position in which the tap is sensed, the first tap and the second tap may be sensed at the same time.

In addition, if the first tap and the second tap are configured from multiple touches, that is, from multiple-times tapping, of course, the multiple touches that make up each of the first tap and the second tap are sensed at the same time. For example, if the first touch that makes up the first tap is sensed and at the same time, the first touch that makes up the second tap is sensed in a position that is a predetermined distance or above from a position in which the first touch that makes up the first tap is sensed, the controller 110 makes it possible to enable the first touch that makes up each of the first tap and the second tap. Then, the controller 110 makes it possible to enable an additional touch input, which is sensed in each position. If the touch is sensed the first reference number of times or greater or the second reference number of times or greater, the controller 110 determines that the first tap and the second tap are applied.

On the other hand, when the tap sensing unit 132 senses multiple times that the tap is applied to the main body of the vehicle control apparatus 100, the controller 110 controls not only the user authentication, but also at least one among functions that is executable on the vehicle control apparatus 100.

Figure 2:
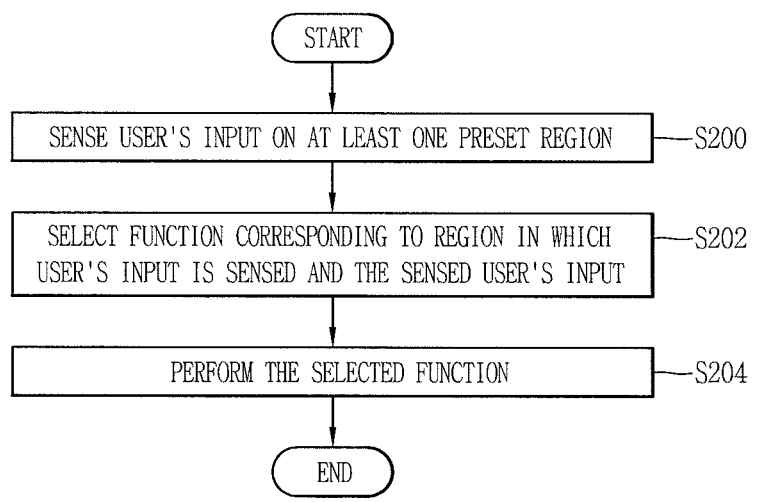
FIG. 2 is a flow chart illustrating an operation process of performing a function corresponding to a user's input in a vehicle control apparatus associated with the present disclosure.

FIG. 2 is a flow chart illustrating an operation process of a vehicle control apparatus associated with the present disclosure.

Referring to FIG. FIG. 2, the controller 110 of the vehicle control apparatus 100 according to an embodiment of the present disclosure senses a user's input in at least one preset sensing region (S200). Here, the sensing region may be implemented in various forms, and formed in both the inside and outside of the vehicle.

For example, the sensing region may be implemented with a touch pad, and implemented at least one or more places. Preferably, the sensing region may be a region formed on at least one or more preset regions of a steering handle, for example, steering wheel.

On the other hand, the sensing region may not of course require the touch pad. For example, when a plurality of knocks or tabs are applied from a preset portion of the steering wheel, an upper cover of the console box or gear box, or the like, the controller 110 may sense it using various sensors such as an acceleration sensor of the tap sensing unit 130, and the like.

Furthermore, when a user's input is sensed during the step S200, the controller 110 may select a function of the vehicle corresponding to a region in which the user's input is sensed and the sensed user's input (S202). For example, when the user's input is sensed from a steering wheel of the steering handle, the controller 110 may determine that the user's input is associated with the steering handle. In this case, the controller 110 may select functions associated with the setting or manipulation of the steering handle based on the user's input.

In other words, when the user's input is sensed from part of the steering handle (for example, steering wheel), the controller 110 may determine that the user's input is to set a height or operation mode of the handle. Furthermore, the controller 110 may allow the user to select and control such functions through an additional tap to the same position or a touch input to another region. To this end, the controller 110 may display screen information associated with functions corresponding to the user's input on the preset display unit 151. Here, the display unit 151 may be temporarily formed on at least part of a windshield glass, a driver's seat window, and a passenger seat window of the vehicle, or provided in a fixed manner on an inner frame such as a console box of the vehicle.

On the other hand, when the user's input is sensed from a predetermined specific region, the controller 110 may display a menu screen corresponding to the preset region. The menu screen may include items associated with various environment control functions of the vehicle or may include different control function items according to a state in which the user's input is sensed. For example, the menu screen may include items associated with functions for a physical environment setting of the vehicle or may include items associated with functions for a software environment setting of the vehicle. In this case, sensing regions corresponding to a menu screen associated with functions for controlling the physical environment setting of the vehicle and a menu screen associated with functions for controlling the software environment setting thereof may be located at different positions.

On the other hand, the user may apply a plurality of taps or long press input to select his or her desired control function from items contained in the menu screen. In this case, the controller 110 may select a specific item on the menu screen based on the plurality of taps or long press input.

On the other hand, the controller 110 may select a user's desired specific control function without the menu screen. For example, the controller 110 may recognize a pattern comprised of a plurality of taps entered from a user, and select a specific control function corresponding to the recognized pattern. Otherwise, the controller 110 may recognize a touch-and-drawing input from the preset sensing region, and select a specific control function corresponding to the touch-and-drawing input. Furthermore, the controller 110 may display information associated with a specific control function selected by a pattern comprised of the plurality of taps or the touch-and-drawing input on the display unit 151.

Furthermore, the controller 110 performs a currently selected function during the step S202 (S204). Here, the controller 110 may perform the selected function through the menu screen. Here, the controller 110 may of course perform a plurality of functions as well as one function.

In addition, the controller 110 may perform a specific function corresponding to a position at which the user's input is sensed. For example, when a plurality of taps are sensed in the vicinity of a ventilation opening formed in the vehicle, the controller 110 may determine the cooling or heating level of the vehicle based on the plurality of taps. Here, the controller 110 may increase the intensity of cooling or heating when the number of the plurality of taps is odd, and decrease the intensity of cooling or heating when the number of the plurality of taps is even. Otherwise, the controller 110 may adjust the direction of wind in an upward direction when the plurality of taps are sensed from an upper portion of the ventilation opening, and on the contrary, the controller 110 may adjust the direction of wind in a downward direction when the plurality of taps are sensed from a lower portion of the ventilation opening.

Similarly, the controller 110 may also adjust the opening level of the driver's seat or passenger seat window based on the plurality of taps. For example, the controller 110 may change the opening level of the windows based on a location at which the plurality of taps are sensed or a number or intensity of the plurality of taps applied thereto.

On the other hand, as described above, a plurality of sensing regions may be provided at multiple positions in the vehicle. In this case, when the sensing regions are all activated, all the regions may sense the user's input, thereby allowing the user to apply a touch input (tap or knock) to more various places to control various functions of the vehicle. However, when such a large number of regions are all activated, a user's undesired touch input may be applied to the regions due to a vibration or shock of the vehicle, and in this case, the user's unintentional control function may be also carried out.

In order to prevent this, the vehicle control apparatus 100 according to an embodiment of the present disclosure may activate only a user's desired specific sensing region or deactivate a specific sensing region satisfying a specific deactivation condition when the specific deactivation condition is satisfied.

Figure 3:
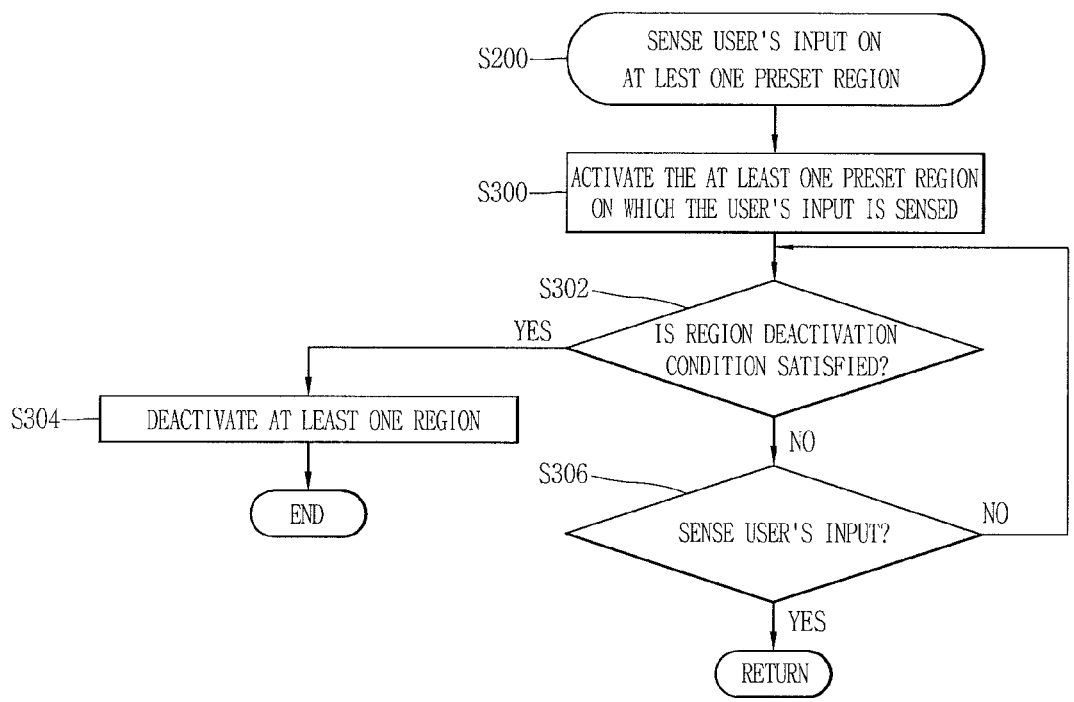
FIG. 3 is a flow chart illustrating an operation process of determining an active state of a preset region to sense a user's input within the process shown in FIG. 2.

FIG. 3 illustrates an operation process of determining an active state of the preset region to sense a user's input.

Referring to FIG. 3, the controller 110 may activate at least one sensing region in which a user's input is sensed from sensing regions formed at each portion of the vehicle (S300). For example, when a locked state of the vehicle is released, the controller 110 may operate a plurality of sensing regions that have been previously formed at an inside or outside of the vehicle in the foregoing doze mode state. The sensing regions operated in a doze mode may be sensing regions in an "inactive state", and the sensing regions in an "inactive state" may denote a state in which the user's input is merely sensed but a function based on the sensed user's input is not carried out.

The user may selectively activate only the sensing regions desired to be activated among the sensing regions being operated in a doze mode. For example, the user may apply a plurality of taps comprised of a preset pattern or enter a specific touch-and-drawing pattern to sensing regions to be activated. Otherwise, the user may user his or her own fingerprint information.

The controller 110 may selectively activate only at least one region in which the user's input is sensed among the sensing region in an inactive state. Here, the sensing region in an "inactive state" may denote a state in which the corresponding specific function may be carried out based on the user's input sensed from the sensing region. Accordingly, the controller 110 may selectively activate only at least part of the plurality of sensing regions formed at an inside or outside of the vehicle. Furthermore, the controller 110 may control a specific function of the vehicle only based on a user's input sensed from the activated region.

On the other hand, when a specific deactivation condition is satisfied even when only the at least part of the sensing regions is selectively activated, the controller 110 may switch at least one sensing region corresponding to the satisfied deactivation condition to an inactive state again. Here, the deactivation condition may be entering a user's input again for switching the sensing region in an inactive state to an active state or a plurality of taps having a preset pattern or a touch-and-drawing input for switching it to an inactive state. Otherwise, it may be a preset condition for the safety driving of the vehicle and the safety of passengers who get on the vehicle.

For example, when the vehicle abruptly takes a curve or drives above a predetermined speed, sensing regions located at a specific portion of the vehicle may be deactivated to enhance the user's driving concentration and prevent a failure control of the vehicle. For an example, the controller 110 may sense a case where the vehicle takes a curve above a predetermined angle through a rotation angle of the steering wheel, and in this case switch at least part of the regions formed on the steering wheel to an inactive state. Otherwise, when the driving speed of the vehicle is above a predetermined level, the controller 110 may switch at least part of the sensing regions formed on the gear box or console box to an inactive state.

When at least one sensing region according to a user's selection is activated during the step S300, the controller 110 determines whether or not there is a sensing region satisfying a deactivation condition among the active regions (S302). Here, the deactivation condition may differ according to the location of each sensing region and/or the characteristics of a function corresponding to the sensing region. For example, an angle of the steering wheel or a speed of the vehicle may be the deactivation condition as described above, and current time information or weather information may be the deactivation condition for a sensing region formed in the proximity of the sunroof to control the operation of the sunroof of the vehicle. Otherwise, current time information may be the deactivation condition for a sensing region for turning on the headlight of the vehicle.

Furthermore, when there is a sensing region satisfying a deactivation condition as a result of the determination during the step S302, the controller 110 proceeds to the step S304 to switch an active state of the relevant sensing region to an inactive state. In this case, the controller 110 may maintain the status of the relevant sensing region in an inactive state until its activation is reselected by the user (for example, a plurality of taps having a preset pattern or a touch-and-drawing input is entered for activation).

On the other hand, when there is no sensing regions satisfying a deactivation condition among the active regions as a result of the determination during the step S302, the controller 110 determines whether or not there is a user's input to the active sensing regions (S306). Furthermore, when there is no regions in which a user's input is sensed among currently active regions as a result of the step S306, the controller 110 may process to the step S302 again to check whether there is any region satisfying a deactivation condition among currently active regions.

On the other hand, when there is a region in which the user's input is sensed among the active sensing regions as a result of the determination during the step S306, the controller 110 proceeds to the step 202 to select at least one of various function that can be carried out by the vehicle control apparatus 100 according to the sensed user's input and a sensing region in which the user's input is sensed, then, the controller 110 performs the selected function during step S204.

On the other hand, when the vibration or shaking of the vehicle is severely generated, the sensing region may malfunction due to its vibration even though the user does not enter a plurality of taps or a touch-and-drawing input. Otherwise, when sensing the plurality of taps, the controller 110 may sense a smaller or larger number of taps than that of taps applied by the user due to severe vibration, shaking or the like. In this case, the controller 110 may perform a user's unintentional function.

In order to prevent such a malfunction, the vehicle control apparatus 100 according to an embodiment of the present disclosure may adjust a sensitivity for sensing a user's input in the sensing region based on a driving state of the vehicle.

Figure 4:
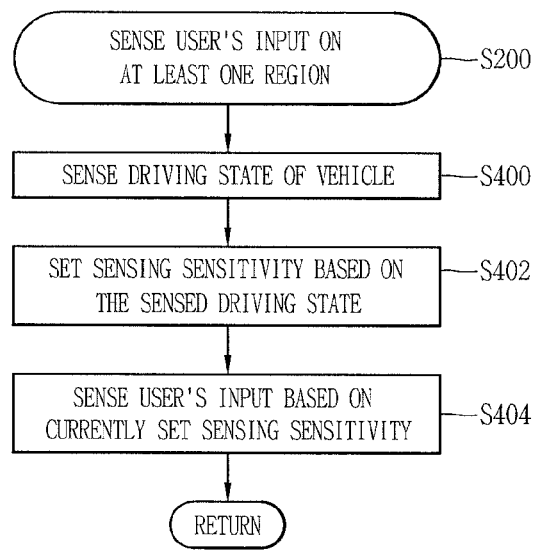
FIG. 4 is a flow chart illustrating an operation process of determining a sensitivity for sensing a user's input based on a driving state of the vehicle within the process shown in FIG. 2.

FIG. 4 is a flow chart illustrating an operation process of determining a sensitivity for sensing a user's input based on a driving state of the vehicle in the vehicle control apparatus 100 according to an embodiment of the present disclosure.

Referring to FIG. 4, the controller 110 may first sense a driving state of the vehicle when sensing a user's input in at least one preset sensing region (S400). For example, the controller 110 may directly sense the current vibration state of the vehicle using various sensors provided in the sensing unit 130, and determine the current driving state of the vehicle based on the sensed result. Otherwise, the controller 110 may determine the current driving state of the vehicle based on whether the current location of the vehicle is on a dirt road or mountainous region or unspecified road according to location measurement information using navigation, a global positioning system (GPS) or the like.

When it is determined that a vibration less than a preset level is sensed and/or the current location of the vehicle is on a paved road as a result of the sensing of the sensing unit 130 during the step S400, it may be determined that the driving state of the vehicle is good. However, when it is determined that a vibration greater than a preset level is sensed and/or the current location of the vehicle is on a unpaved road as a result of the sensing of the sensing unit 130 during the step S400, it may be determined that the driving state of the vehicle is not good.

Furthermore, the controller 110 determines a sensitivity for sensing a user's input in the sensing region based on the driving state of the vehicle determined during the step S400 (S402). Then, the controller 110 senses a user's input based on the determined sensitivity (S404). Accordingly, when the driving state of the vehicle is good as a result of the determination during the step S400, the controller 110 may increase the sensitivity of the sensing region. In this case, the sensing region may be sensitively sense a user's input, and thus sense it when the user lightly applies a plurality of taps or applies a touch-and-drawing input.

However, when the driving state of the vehicle is not good as a result of the determination during the step S400, the controller 110 may decrease the sensitivity of the sensing region. In this case, since the sensing region has a low sensitivity to the user's input, it may be sensed only when the user more strongly applies the tap or applies a touch-and-drawing input with a higher force.

On the other hand, the controller 110 may of course further consider a current speed of the vehicle when determining the driving state of the vehicle. For example, when the speed of the vehicle is low, the controller 110 may determine that the driving state of the vehicle is good even though the vehicle is on an unpaved load, and on the contrary, determine that the driving state of the vehicle is not good even though the vehicle is on a paved load.

In a preset period of time or when the location of the vehicle is changed (for example, from a paved load to an unpaved load or from an unpaved load to a paved load), the controller 110 may repeatedly perform the steps S400 and S404 to set the sensitivity of the sensing region again.

On the other hand, in the above description, an operation process of the vehicle control apparatus 100 according to an embodiment of the present disclosure has been described in detail with reference to the accompanying drawings.

Hereinafter, the operations of the vehicle control apparatus according to an embodiment of the present disclosure will be described in more detail with reference to exemplary views.

Figure 5A:
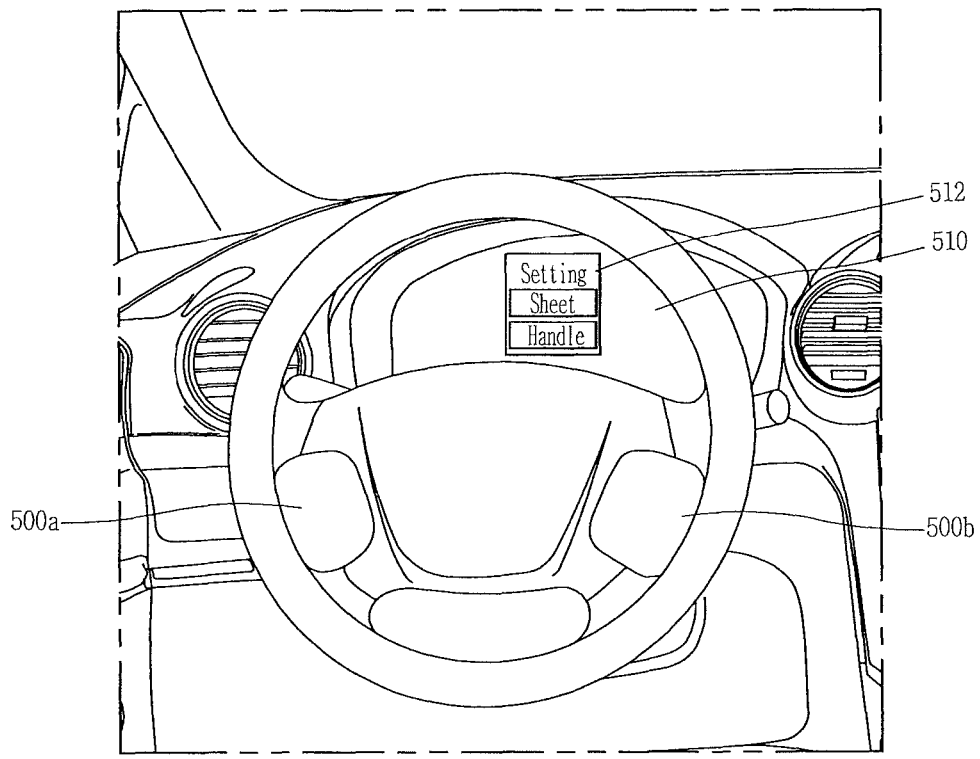
FIGS. 5A and 5B are exemplary views illustrating preset regions for sensing a user's input in a vehicle control apparatus according to an embodiment of the present disclosure.
Figure 5B:
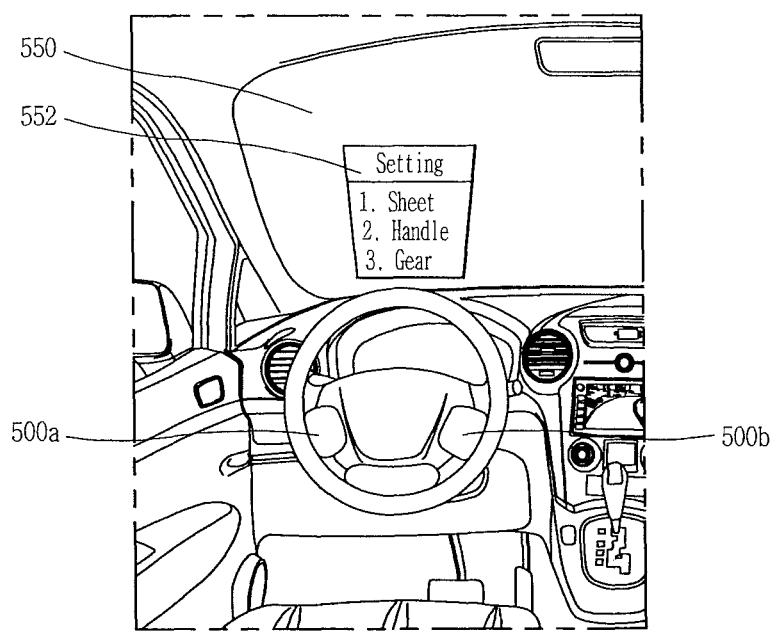
Figure 6A:
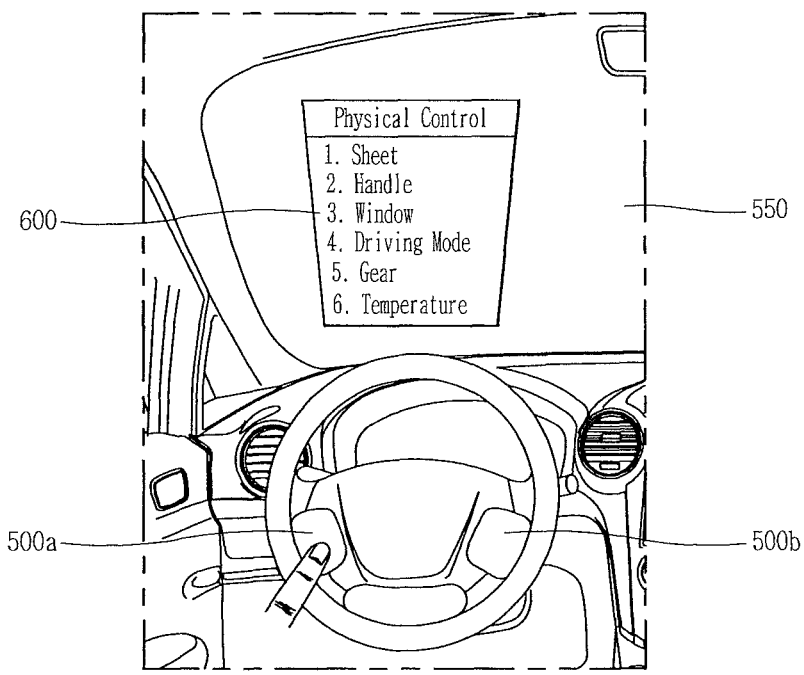
FIGS. 6(a) and 6(b) are exemplary views illustrating a different control menu based on a region in which the user's input is sensed in a vehicle control apparatus according to an embodiment of the present disclosure.
Figure 6B:
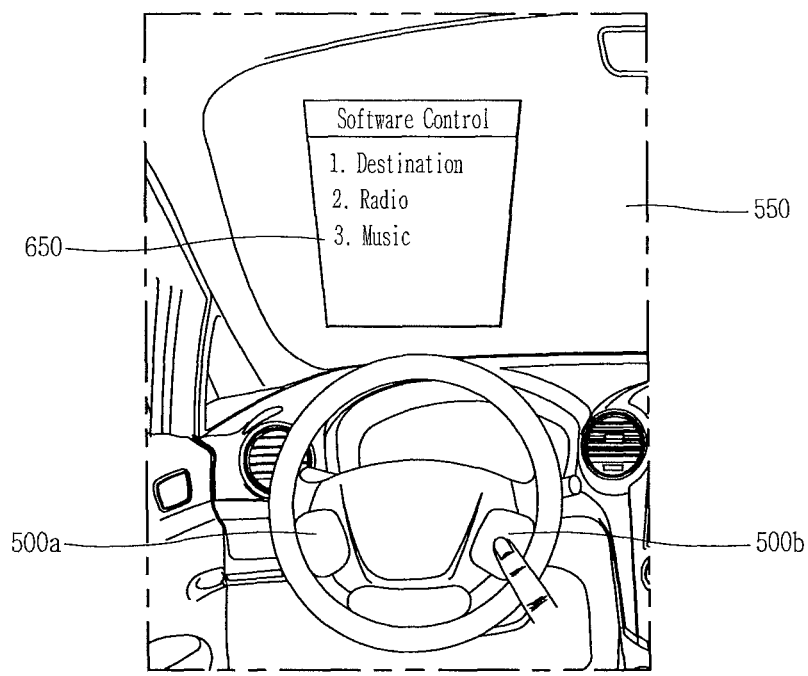

FIGS. 5A and 5B are exemplary views illustrating preset regions for sensing a user's input in a vehicle control apparatus according to an embodiment of the present disclosure. FIGS. 6(a) and 6(b) are an exemplary views illustrating a different control menu based on a region in which the user's input is sensed in a vehicle control apparatus according to an embodiment of the present disclosure.

First, FIGS. 5A and 5B illustrate an example in which two sensing regions 500a, 500b are formed on a steering wheel. For example, the sensing regions 500a, 500b formed on the steering wheel may be formed on a rotation portion in a direction of facing each other as illustrated in FIG. 5A.

When the sensing regions 500a, 500b are formed in a partial region of the steering wheel, the user may apply a touch input to the sensing region using a specific finger (for example, both thumbs), thereby performing his or her desired control function even when driving the vehicle.

On the other hand, the sensing regions 500a, 500b may be implemented in the form of a touch pad. However, the sensing regions 500a, 500b is not necessarily implemented in the form of a touch pad. It is because the sensing unit 130 can sense a plurality of user's knocks (taps) applied to the sensing region in any degree using an acceleration sensor or the like to perform a specific function based on a pattern comprised of the plurality of taps or the like even if the sensing regions 500a, 500b are not implemented in the form of a touch pad. Accordingly, the present disclosure may not be necessarily limited to the implementation of the sensing regions 500a, 500b in the form of a touch pad, and for the sake of convenience of explanation, it is assumed in the following description that the sensing regions 500a, 500b are implemented in the form of a touch pad.

On the other hand, the controller 110 may display screen information corresponding to a user's input (for example, a plurality of taps, a touch-and-drawing input, etc.) applied to the sensing regions 500a, 500b on the display unit 151. Here, the display unit 151 may be previously mounted on an inner frame of the vehicle or formed at least part of the window or windshield glass in the form of a transparent display. Here, FIGS. 5A and 5B illustrate such examples, wherein FIG. 5A illustrates an example in which the display unit 151 is previously mounted on an inner frame of the vehicle, and FIG. 5B illustrates an example in which the display unit 151 is formed on a windshield glass.

As illustrated in FIG. 5A, when the display unit 151 is implemented in a form that the display unit 151 is mounted on an inner frame 510 of the vehicle, various screen information 512 according to a user's input sensed on the sensing regions 500a, 500b may be displayed on the display unit 151 mounted on the inner frame 510.

However, when at least part of the windshield glass 550 of the vehicle is implemented in the form of a transparent display, the screen information 552 may be displayed on at least part of the windshield glass 550 of the vehicle as illustrated in FIG. 5B. To this end, at least part of the windshield glass 550 may be designed in an electrode form, and moreover, implemented in the form of a touch screen integrated into the touch sensor.

On the other hand, it has been described as an example that at least part of the windshield glass 550 is implemented in the form of a transparent display in FIG. 5B, but it is merely an example of the present disclosure, and the present disclosure may not be necessarily limited to this. In other words, though not shown in the drawing, at least part of a driver's seat or passenger seat window, room mirror or sunroof may be of course implemented in the form of a transparent display to display screen information. Accordingly, the present disclosure may not be necessarily limited to displaying screen information only on the windshield glass 550, and in the following description, for the sake of convenience of explanation, it is assumed that screen information is displayed on the windshield glass 550.

On the other hand, according to the foregoing description, it has been described that the vehicle control apparatus 100 according to an embodiment of the present disclosure may display a menu screen including at least one control function item based a sensing region in which a user's input is sensed and the user's input as screen information on the display unit 151. Furthermore, the menu screen may include items corresponding to function for controlling a physical environment setting of the vehicle or functions for controlling a software environment setting thereof. Furthermore, a menu screen associated with function for controlling the physical environment setting and a menu screen associated with functions for controlling the software environment setting may correspond to different sensing regions, respectively.

FIGS. 6(a) and 6(b) illustrate such examples.

For example, it is assumed that FIG. 6(a) illustrates examples in which the first sensing region 500a provided at the left side of the steering wheel corresponds to a menu screen associated with functions for controlling the physical environment setting among the menu screens. In this case, when a user's input, for example, a plurality of taps or a preset touch-and-drawing input, is sensed on the first sensing region 500a as illustrated in FIG. 6(a), the controller 110 may display items 600 associated with functions for controlling the physical environment setting on at least part of the windshield glass 550.

Here, there may exist various functions for controlling the physical environment setting. For example, as illustrated in FIG. 6(a), the functions may include a sheet, a handle, a window, a driving mode, a gear, a temperature or the like, and the functions of each item may change the corresponding each environment state within the vehicle.

For example, in case of an item "1. Sheet", the item may correspond to various control functions associated with the control of a sheet. For example, the item "1. Sheet" may correspond to a function of setting a seat height of the driver's seat or passenger seat or a horizontal position of the seat (a gap of the seat). Here, the user may select the first sensing region 500a using a plurality of taps or the like, and then apply an additional touch input (for example, a touch-and-drawing input or touch-and-swipe input) to the first sensing region 500a and/or second sensing region 500b to select a specific function from the item "1. Sheet" or change the setting (for example, a height or horizontal position of the seat, etc.).

Similarly, in case of an item "2. Handle", the item may correspond to various control functions associated with the handle. For example, the item may correspond to functions capable of changing an operation mode of a power steering apparatus connected to a steering handle or adjusting the height of the handle or the like. Furthermore, in case of an item "3. Window", the item may correspond to a function capable of setting an opening degree of the driver's seat or passenger seat window or the like, and in case of an item "4. Driving mode", the item may correspond to functions capable of selecting a driving mode of the vehicle, for example, a typical mode or auto cruise control mode. Otherwise, in case of an item "5. Gear", the item may correspond to a function capable of selecting a gear transmission method, namely, a manual transmission method or automatic transmission method, and in case of an item "6. Temperature", the item may correspond to functions capable of adjusting an internal temperature of the vehicle, a ventilation state or the like.

On the other hand, it is assumed that FIG. 6(b) illustrates an example that the second sensing region 500b corresponds to a menu screen associated with functions for controlling the software environment setting. In this case, as illustrated in FIG. 6(b), when a user's input is sensed on the second sensing region 500b, items 650 associated with functions for controlling the software environment setting may be displayed on at least part of the windshield glass 550.

FIG. 6(b) assumes a case where functions for controlling the software environment setting includes a function of automatically setting a destination (1. Destination), a function of setting a radio channel (2. Radio), and a function of selecting music (3. Music). In this case, the item "1. Destination" may correspond to a function of allowing the user to set a destination through navigation. For example, the controller 110 may automatically select at least one destination based on a current time and the user's driving habit, and display a route of any one of the selected destinations on the display unit 151 implemented with the windshield glass 550.

Furthermore, the items "2. Radio" and "3. Music" may display a list including at least one radio channel or media data (for example, a music file such as MP3), respectively, on the display unit 151 or automatically select a specific radio channel or media data. For example, when the items "2. Radio", "3. Music" are selected, the controller 110 may automatically select a radio channel or music file to which the user is typically listening at a current time.

On the other hand, the user may change the size of screen information displayed at his or her pleasure based on a touch-and-drawing input or swipe input to the sensing regions 500a, 500b. For example, the user may apply the drag input or swipe input in a different direction with respect to the sensing regions 500a, 500b, respectively, thereby obtaining a similar effect to that of entering a pinch-in or pinch-out input on the mobile terminal.

Figure 7A:
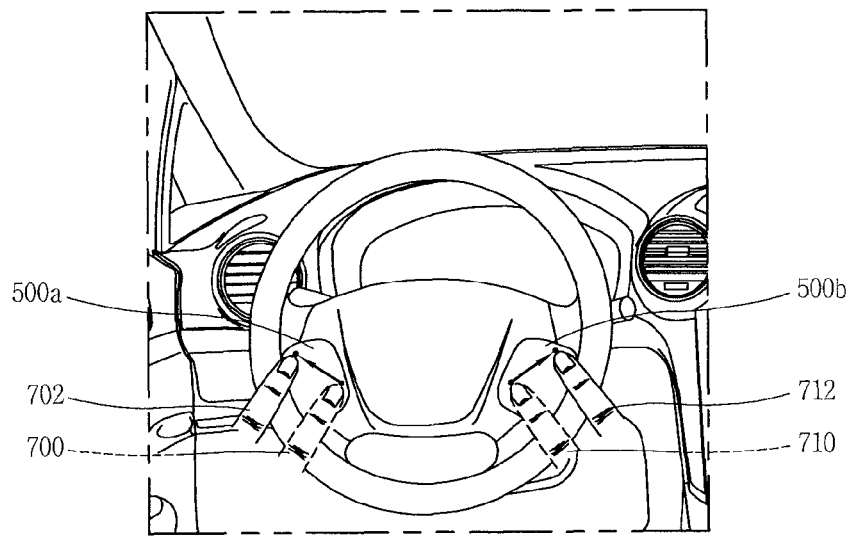
FIGS. 7A(a), 7A(b), 7B(a) and 7B(b) are exemplary views in which image information displayed thereon is changed based on a user's touch input.
Figure 7A:
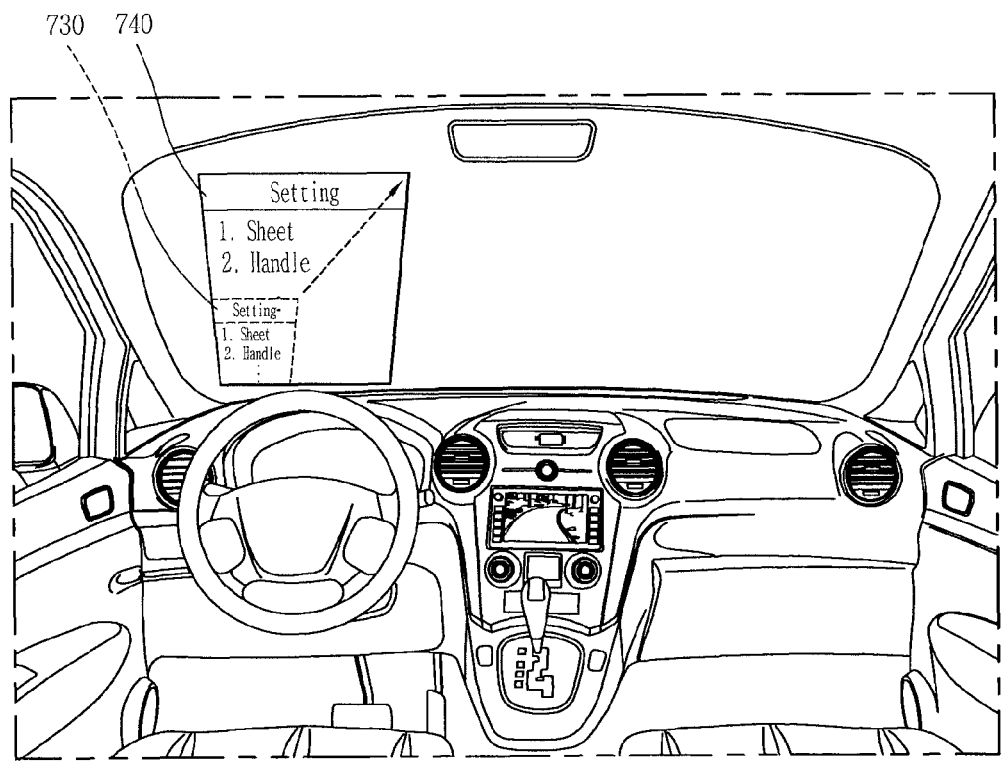

FIGS. 7A(a), 7A(b), 7B(a) and 7B(b) illustrate such an example.

For example, as illustrated in FIG. 7A(a), when the user applies a drag input in a direction of being away between each touch position 700, 710 with respect to the sensing regions 500a, 500b, respectively, at the each touch position 700, 710 to which an initial touch is entered (702, 712), a distance between the positions 702, 712 at which the drag input is terminated is greater than that between the positions 700, 710 to which an initial touch is applied.

When a distance between the positions at which the drag input is terminated is greater than that between the positions to which an initial touch is applied as described above, the controller 110 may determine that the user has applied a pinch-out input. Furthermore, the controller 110 may increase the size of the screen information 730 based on the increased distance. Accordingly, as illustrated in FIG. 7A(b), the size of the initially displayed screen information 730 may be changed to a size shown on the screen information 740.

Figure 7B:
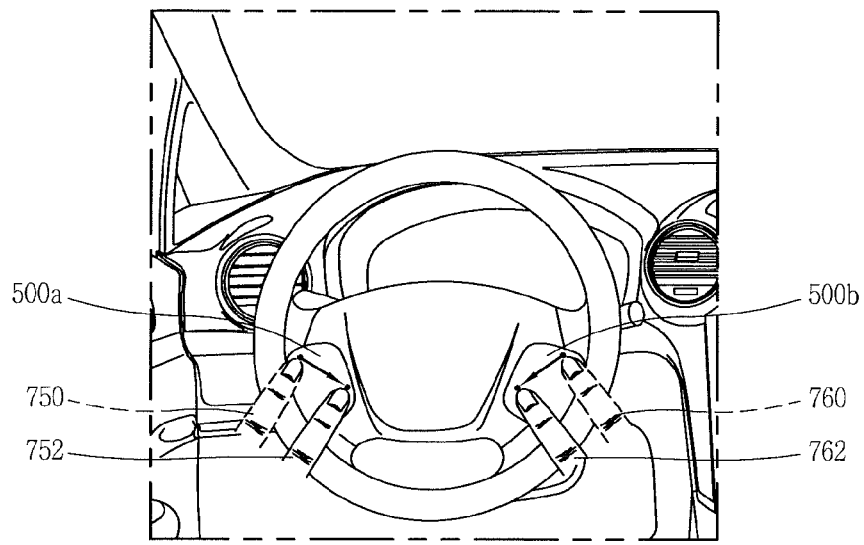
Figure 7B:
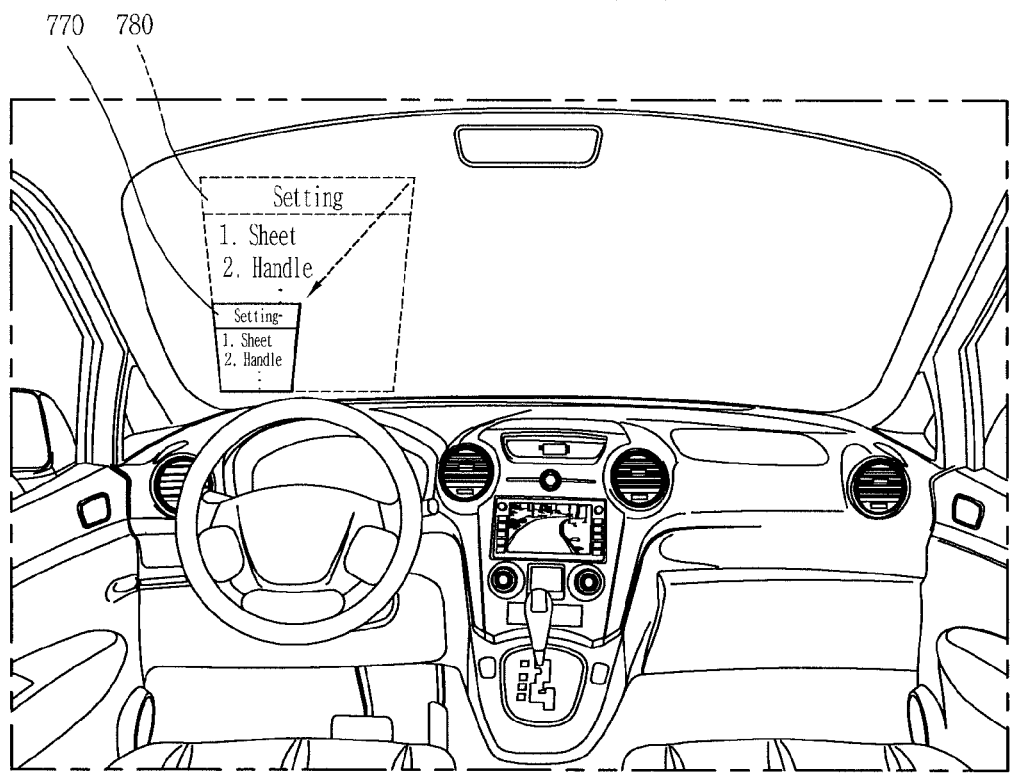

On the contrary, when the user applies a drag input in a direction of being closer between each touch position 750, 760 with respect to the sensing regions 500a, 500b, respectively, at the each touch position 750, 760 to which an initial touch is entered (752, 752) as illustrated in FIG. 7B(a), a distance between the positions 752, 752 at which the drag input is terminated is less than that between the positions 750, 750 to which an initial touch is applied.

When a distance between the positions at which the drag input is terminated is less than that between the positions to which an initial touch is applied as described above, the controller 110 may determine that the user has applied a pinch-in input. Furthermore, the controller 110 may decrease the size of the screen information 780 based on the decreased distance. Accordingly, as illustrated in FIG. 7B(b), the size of the initially displayed screen information 780 may be changed to a size shown on the screen information 770.

On the other hand, the vehicle control apparatus 100 may of course switch the status of the vehicle from a locked state to a lock-released state or switch the status of the vehicle from a lock-released state to a locked state through the user's authentication in addition to performing a specific function according to a user's input to the sensing region as described above.

Figure 8A:
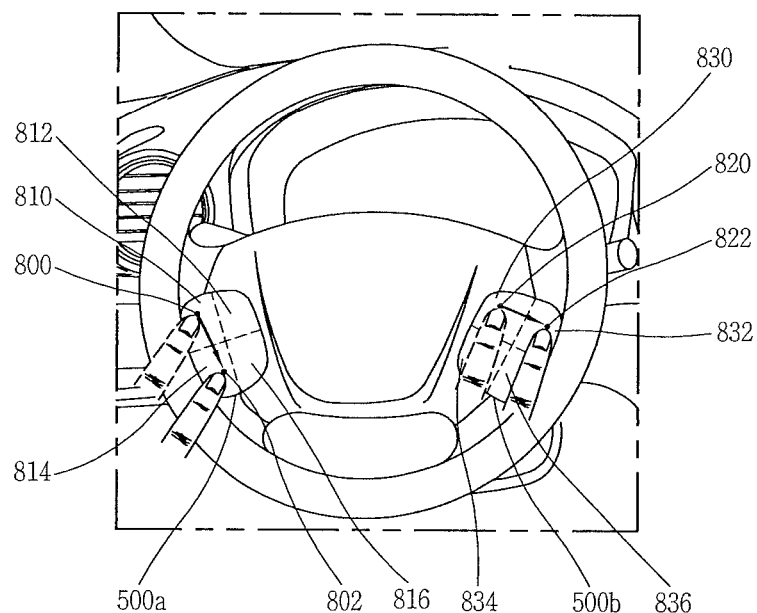
FIGS. 8(a) and 8(b) are exemplary views in which user authentication information is received through preset sensing regions in a vehicle control apparatus according to an embodiment of the present disclosure.
Figure 8B:
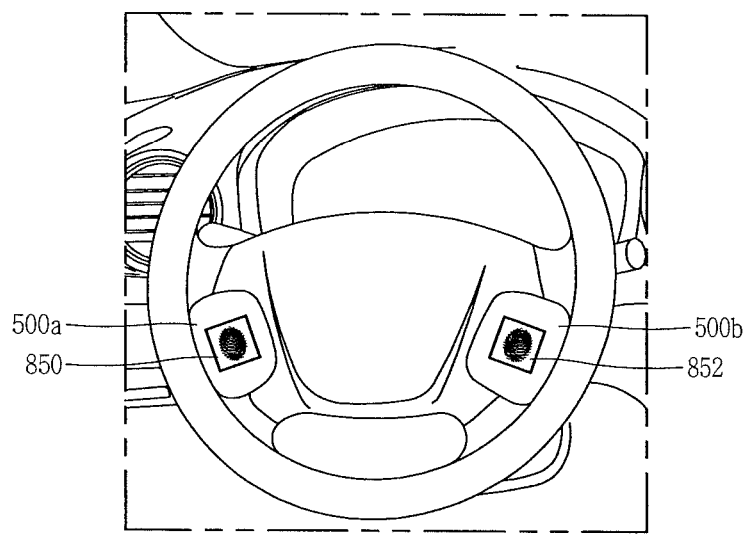

FIGS. 8(a) and 8(b) are an exemplary views in which user authentication information is received through preset sensing regions in a vehicle control apparatus according to an embodiment of the present disclosure in this case.

The user may enter his or her own authentication information to both the sensing regions 500a, 500b or enter authentication information only through either one sound source recognition unit as illustrated in FIGS. 8(a) and 8(b). For example, as illustrated in FIG. 8A(a), the sensing regions 500a, 500b may be partitioned into a plurality of regions, respectively, and may have a unique number for each region. In this case, the user may sequentially apply taps to the partitioned quadrants of the sensing regions 500a, 500b, respectively, to enter authentication information, thereby releasing a locked state of the vehicle.

In other words, as illustrated in FIG. 8A(a), a touch drawing a path from a first position 800 of a first quadrant 810 to a second position 802 of another quadrant (third quadrant) 814 may be applied from the user. Furthermore, a selection sequence of the first quadrant 810 and third quadrant 814 selected by the touch or a touch drawing a path from the first position 800 to the second position 802 may be the user's authentication information applied to the first sensing region 500a. Furthermore, similarly, a touch drawing a path from the first position 820 of the second sensing region 500b to the second position 822 or a selection sequence of the first quadrant 830 and second quadrant 832 corresponding to the first position 820 may be the user's authentication information applied to the second sensing region 500b. In this case, the controller 110 may determine whether or not the user who enters the authentication information is an authenticated user using the user's authentication information applied to the first sensing region 500a and second sensing region 500b.

Here, the controller 110 may determine whether or not the user is an authenticated user based on a sequence in which authentication information is applied to the first sensing region 500a and second sensing region 500b, respectively, as well as the authentication information applied to the first sensing region 500a and second sensing region 500b, respectively. In other words, when a region to which authentication information is initially entered is different between the first sensing region 500a and second sensing region 500b even though authentication information applied to the first sensing region 500a and second sensing region 500b, respectively, is correct, the controller 110 may determine that the relevant user is not an authenticated user or determine the relevant user as a different user.

On the other hand, FIGS. 8(a) and 8(b) illustrate examples in which the user's fingerprint information is used as the authentication information. For example, the vehicle control apparatus 100 according to an embodiment of the present disclosure may authenticate the user using at least two fingerprints as illustrated in FIG. 8(b). In this case, the user may enter fingerprint information to at least one of the first input region 850 and second input region 852 set to the first sensing region 500a and second sensing region 500b, respectively. In this case, the controller 110 may authenticate the relevant user based on the entered fingerprint and/or a sequence in which the fingerprint is entered.

When the user's authentication is completed as described above, the controller 110 may the authentication result on the display unit 151. Here, the display unit 151 may be mounted on an inner frame of the vehicle or implemented in the form of a transparent display on at least part of the driver's seat, passenger seat window or windshield glass. Furthermore, the controller 110 may display part of currently authenticated user's authentication information on the display unit 151 to allow the user to check that a user who currently enters the authentication information or a currently authenticated user is himself or herself.

On the other hand, when the user's authentication is completed, the controller 110 may switch the status of the vehicle from a locked state to a lock-released state. Here, the status of the vehicle in a locked state may denote a state in which a door of the vehicle is locked and/or the functions of the vehicle such as starting of the vehicle or the like is limited. Furthermore, the status of the vehicle in a state of being released from the locked state may denote a state in which a door of the vehicle is open and/or a state in which the starting of the vehicle is carried out or various functions of the vehicle such as playing music or cooling and heating operation or the like are activated to be driven according to the user's selection.

On the other hand, when the status of the vehicle is in a locked state, the first sensing region 500a and second sensing region 500b may automatically enter to a state for receiving authentication information as illustrated in FIGS. 8(a) and 8(b) (a state of being partitioned into a plurality of quadrants or a state in which a region for entering fingerprint information is formed), and otherwise, may enter a state for receiving the authentication information subsequent to being activated according to the user's selection (for example, a preset activation pattern input) when the status of the vehicle is in a locked state.

Furthermore, when the user's authentication information is entered in case where the vehicle is not in a locked state (i.e, a state in which the lock is released), the controller 110 may of course switch the status of the vehicle to a locked state based on the authentication information. In this case, when the authentication information is entered, the controller 110 may automatically switch the status of the vehicle to a locked state when a passenger in the vehicle gets off in case where the movement of the vehicle is stopped and the starting of the vehicle is off.

On the other hand, the sensing regions 500a, 500b may be applied and used in various forms. For example, the sensing regions 500a, 500b may be used to enter a user's selection to a specific application program.

Figure 9A:
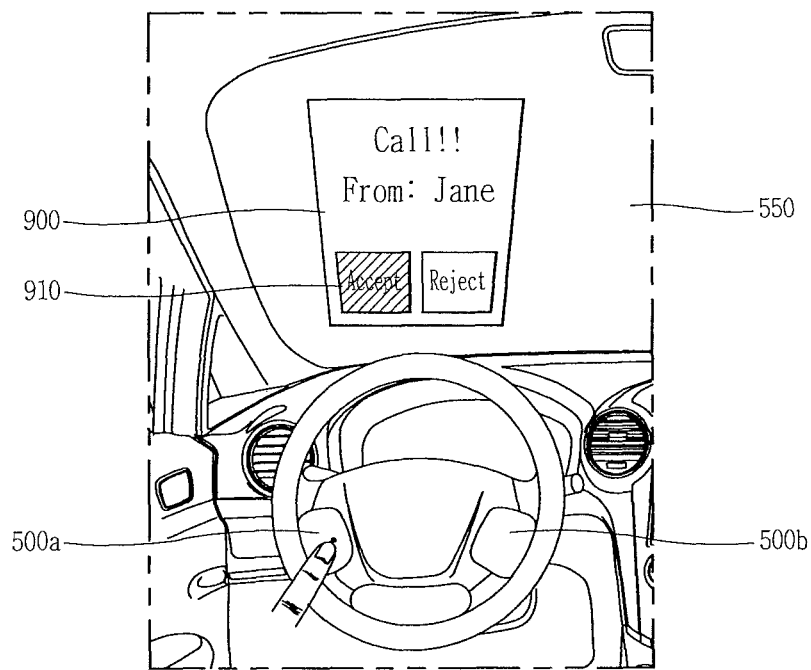
FIGS. 9(a) and 9(b) are exemplary views in which the user's selection is entered through preset sensing regions in a vehicle control apparatus according to an embodiment of the present disclosure.
Figure 9B:
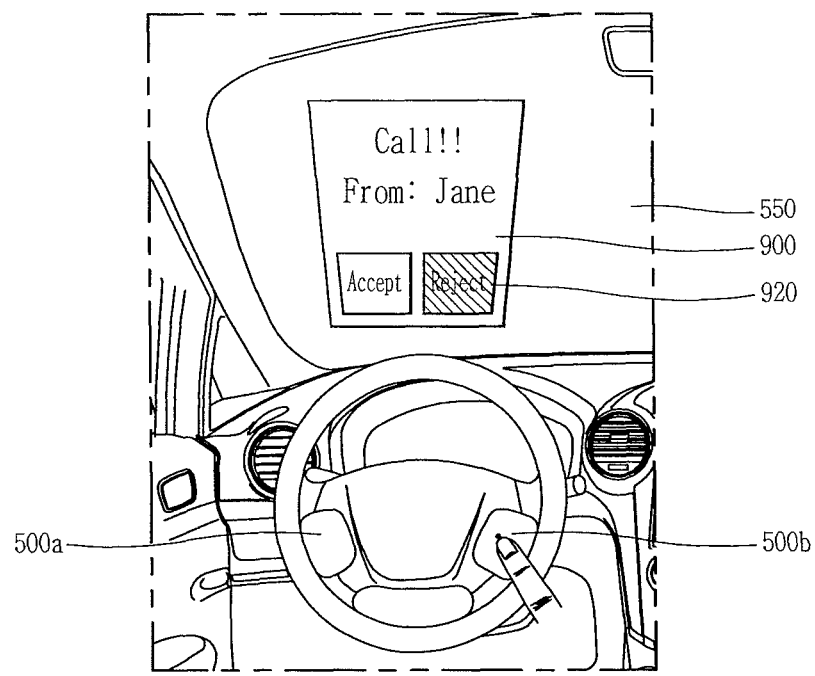

FIGS. 9(a) and 9(b) illustrate such an example.

According to the foregoing description, it has been stated that the vehicle control apparatus 100 according to an embodiment of the present disclosure can display screen information on at least part of the terminal 500. Accordingly, the controller 110 may display various information associated with an execution screen of the application programs driven by the vehicle control apparatus 100 on the windshield glass 550.

For example, FIGS. 9(a) and 9(b) illustrate an example in which screen information 900 associated with a phone function is displayed on the windshield glass 550. In this case, the controller 110 may allow the user to select whether to accept or reject the current incoming call, and determine it based on a user's input to the first sensing region 500a or second sensing region 500b.

For example, optional items (accept 910, reject 920) contained in the screen information 900 may be set to correspond to the first sensing region 500a and second sensing region 500b, respectively. In this case, when the user applies a plurality of taps or a touch input to the first sensing region 500a as illustrated in FIG. 9(a), the controller 110 may determine that the user selects "accept 910" among the optional items. In this case, the controller 110 may connect to the current incoming call to make a call to the user.

On the other hand, when the user applies a plurality of taps or a touch input to the second sensing region 500b as illustrated in FIG. 9(b), the controller 110 may determine that the user selects "reject 920" among the optional items. In this case, the controller 110 may terminate the current incoming call.

On the other hand, though a specific item is merely selected by allowing the user to select a specific sensing region in the foregoing FIGS. 9(a) and 9(b), there may be of course a larger number of optional items. In this case, the controller 110 may move a cursor for selecting any one of the optional items based on a user's plurality of taps, a touch-and-drawing input, a swipe input or the like applied to the sensing regions 500*a*, 500*b*, respectively, and may of course determine that any one optional item is selected based on the location of the cursor.

In addition, it is assumed that only two sensing regions 500*a*, 500*b* are provided on the steering wheel in FIGS. 9(*a*) and 9(*b*), but the number of the sensing regions may be of course increased. In this case, each sensing region may correspond to at least one or more optional items, respectively, and in this case, the user may select his or her desired item using a plurality of taps or a touch input to the corresponding sensing region.

On the other hand, according to the foregoing description, an example in which when a user's input is sensed on a specific sensing region, a specific menu screen corresponding to the relevant sensing region is displayed with screen information, but on the contrary, a specific function may be of course carried out based on the user's input.

Figure 10A:
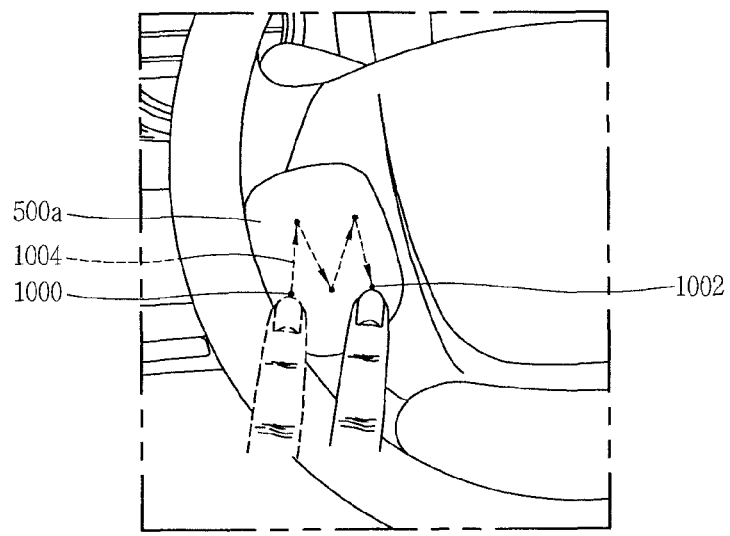
FIGS. 10A(a), 10A(b), 10B(a) and 10B(b) are exemplary views in which a specific function is carried out based on a pattern input to a preset input region in a vehicle control apparatus according to an embodiment of the present disclosure.
Figure 10A:
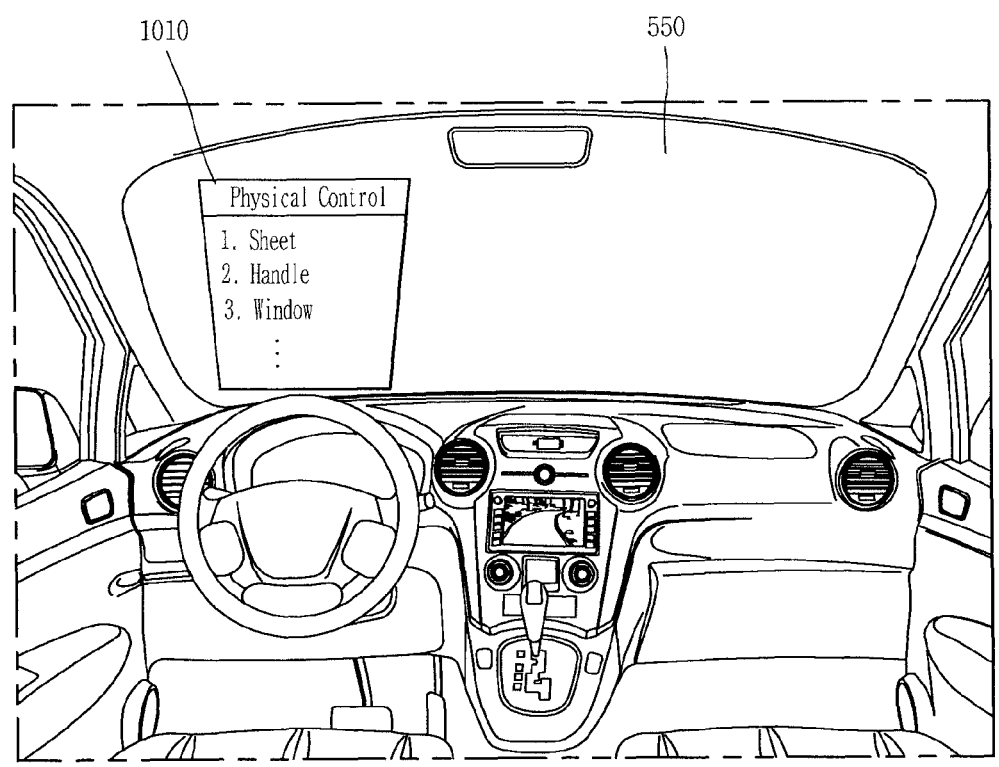

FIGS. 10A(a), 10A(b), 10B(a) and 10B(b) are exemplary views in which a specific function is carried out based on a pattern input to a preset input region in a vehicle control apparatus according to an embodiment of the present disclosure.

For example, when the user applies a preset touch-and-drawing input to any one of the sensing regions 500*a*, 500*b*, the controller 110 may recognize the touch-and-drawing trajectory. Furthermore, the controller 110 may perform a function corresponding to the recognized trajectory.

FIGS. 10A(a) and 10A(b), illustrate such an example. Referring to FIGS. 10A(a) and 10A(b), when a user's touch input forms a drawing trajectory 1004 while moving from a first position 1000 to a second position 1002, the controller 110 may recognize the formed drawing trajectory 1004.

For example, the controller 110 may recognize the drawing trajectory 1004 as a text. In this case, the controller 110 may perform a function corresponding to a text "M" recognized from the drawing trajectory 1004. For example, a function corresponding to the recognized text "M" may be a "menu", and accordingly, a preset menu screen may be displayed on the windshield glass 550.

Accordingly, as illustrated in FIG. 10A(b), a "physical environment setting (physical control) screen 1010" may be displayed on the windshield glass 550 as a function corresponding to the text "M recognized from the drawing trajectory 1004.

On the other hand, in a state that the menu screen 1010 is displayed as described above, the user may select his or her desired specific item using various inputs to the sensing regions 500*a*, 500*b*. For example, when a plurality of tap patterns corresponding to a specific item are applied to any one of the sensing regions 500*a*, 500*b* or a drawing trajectory corresponding to the specific item (for example, a drawing trajectory corresponding to the number of the specific item) is entered, the controller 110 may select the specific item corresponding to this. Otherwise, the controller 110 may select the specific item based on the direction and trajectory of the user's touch-and-drawing input applied to the sensing regions 500*a*, 500*b*.

Figure 10B:
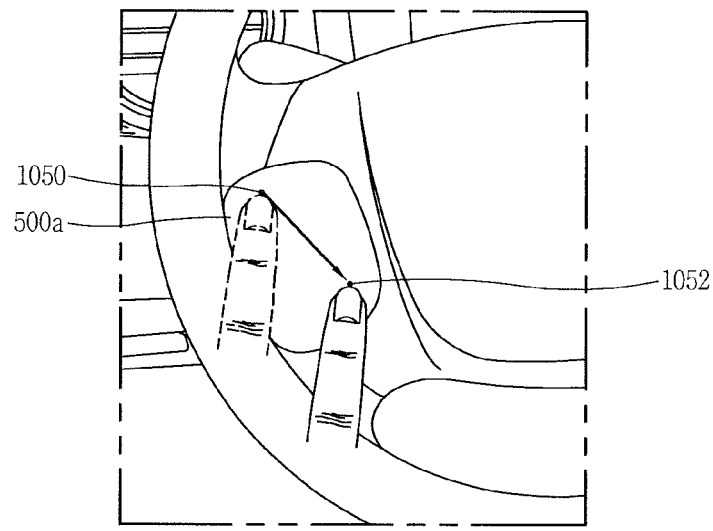
Figure 10B:
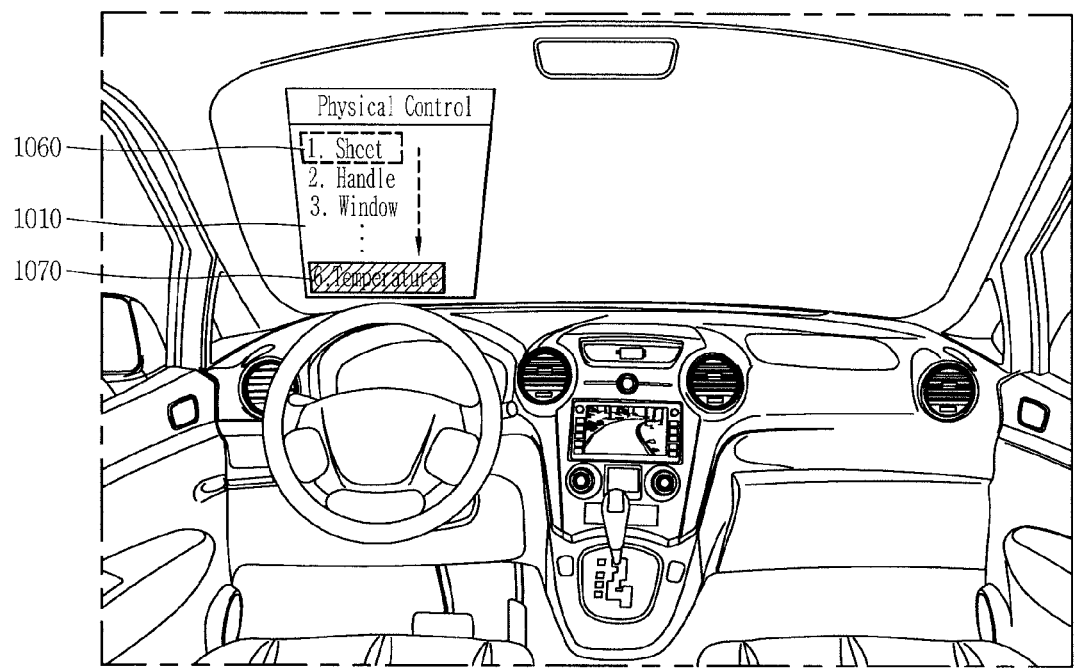

FIGS. 10B(a) and 10B(b) illustrate such an example. For example, when the user applies a touch-and-drawing input from a first position 1050 to a second position 1052 on the first sensing region 500*a* as illustrated in FIG. 10B(a), the controller 110 may recognize the length and direction of a drag trajectory from the first position 1050 to the second position 1052, and select a specific item on the menu screen 1010 based on the recognized length and direction of the trajectory. Accordingly, as illustrated in FIG. 10B(b), a guideline 1060 for displaying a currently selected item may sequentially move in a downward direction according to the recognized length and direction of the trajectory to be located at a position displayed with "6. Temperature" on the menu screen 1010. Furthermore, in this case, the user may perform a function of the currently selected item with a plurality of taps or a touch input.

On the other hand, according to the foregoing FIGS. 10A(a) and 10A(b), it has been described that a touch-and-drawing input is applied only to the first sensing region 500*a*, but it may be also applicable to the second sensing region 500*b*.

For example, when a touch-and-drawing trajectory similar to the foregoing FIGS. 10A(a) and 10A(b) are applied to the second sensing region 500*b*, the controller 110 may of course display screen information corresponding to this, namely, a menu screen. Furthermore, in this case, a menu screen displayed on the windshield glass 550 may be a "software environment setting menu (software control screen)" which is a menu screen corresponding to the second sensing region 500*b*.

In addition, when the touch-and-drawing trajectory that can be recognized as a text "M" in both the sensing regions 500*a*, 500*b*, the controller 110 may of course display both the "physical environment setting menu (physical control) screen" and "software environment setting menu (software control) screen" on the windshield glass 550. In this case, the user may of course apply a plurality of taps, a touch-and-drawing input or a swipe input to the sensing regions 500*a*, 500*b*, respectively to select his or her desired items from each menu screen.

On the other hand, when a text recognized from the touch-and-drawing trajectory is different, the controller 110 may of course execute a function corresponding to the recognized different text. For example, when a text recognized from a touch-and-drawing trajectory applied to the first sensing region 500*a* is "L", the controller 110 may recognize it as switching the status of the vehicle to a locked state to switch the status of the vehicle to a locked state.

Furthermore, when a text recognized from the touch-and-drawing trajectory is "L", different lock functions may correspond to the first sensing region 500*a* and second sensing region 500*b*, respectively. For example, when a touch-and-drawing trajectory applied from the first sensing region 500*a* forms a text "L", the controller 110 may lock at least one of doors (for example, a driver's seat door and a rear seat door of the driver's seat when the driver's seat is located on the left side) corresponding to the left side on the basis of a front surface of the vehicle. Furthermore, when a touch-and-drawing trajectory applied from the second sensing region 500*b* forms a text "L", the controller 110 may lock at least one of doors (for example, a passenger seat door and a rear seat door of the passenger seat when the driver's seat is located on the left side) corresponding to the right side on the basis of a front surface of the vehicle. In this manner, a function corresponding to the touch-and-drawing trajectory may be carried out in various ways, and a different function may be of course carried out based on a sensing region to which the touch-and-drawing trajectory is entered. Moreover, the controller 110 may of course allow the user to generate a specific touch-and-drawing trajectory corresponding to a specific function of the vehicle.

On the other hand, according to the foregoing description, it has been stated that the vehicle control apparatus 100 according to an embodiment of the present disclosure can activate or deactive only a specific sensing region according to the user's selection. In this case, the controller 110 may display a currently activated sensing input region in various ways.

Figure 11A:
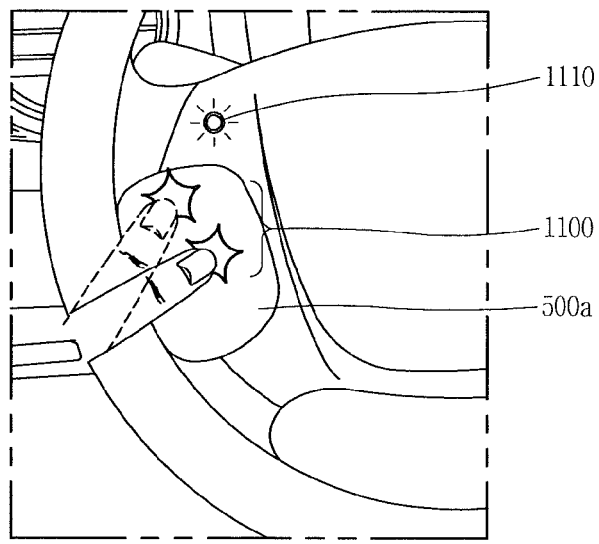
FIGS. 11(a) and 11(b) are exemplary views illustrating examples in which a specific sensing region is activated in a vehicle control apparatus according to an embodiment of the present disclosure.
Figure 11B:
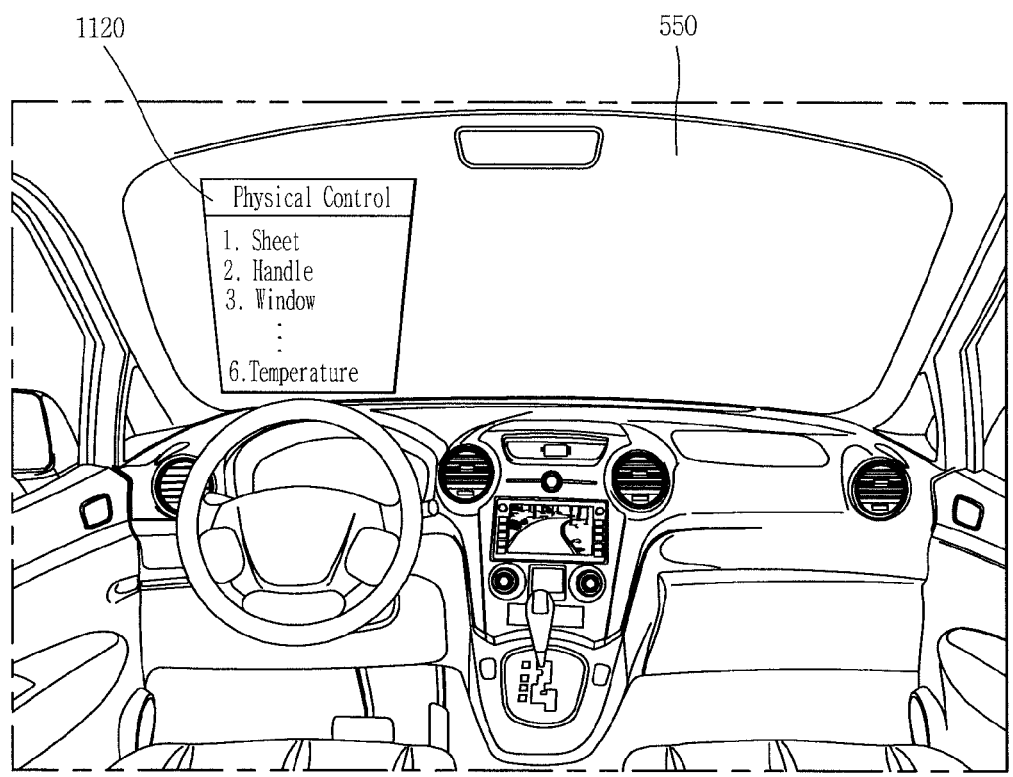

FIGS. 11(*a*) and 11(*b*) illustrate an example in which a specific sensing region is activated in a vehicle control apparatus according to an embodiment of the present disclosure in this case.

Referring to FIGS. 11(*a*) and 11(*b*), for example, when the user applies a plurality of taps to the first sensing region 500*a* as illustrated in FIG. 11(*a*), the controller 110 may recognize the plurality of taps as an input for activating the first sensing region 500*a*. In this case, the controller 110 may notify the user that the first sensing region 500*a* is in an active state using an additional light emitting diode (LED) 1100 as illustrated in FIG. 11(*a*). In other words, the LED 1100 may correspond to the first sensing region 500*a*, and be turned on when the first sensing region 500*a* is in an active state or turned off when the first sensing region 500*a* is in an inactive state, thereby displaying whether or not the first sensing region 500*a* is in an active state for the user.

On the other hand, when the sensing region corresponds to a specific menu screen, the controller 110 may display a menu screen corresponding to a currently active sensing region on the windshield glass 550 to display the currently active sensing region. In this case, a menu screen displayed to notify whether or not the sensing region is active may be of course automatically turned off when a user's input is not applied to the corresponding sensing region after a predetermined period of time has passed.

On the other hand, it has been described that the active sensing region can be switched to an inactive state when various deactivation conditions are satisfied. In this case, the controller 110 may notify information on sensing regions that have been switched to the inactive state to the user in various ways. For example, the controller 110 may output auditory information on a currently inactive sensing region to the user through the audio output unit 152 or display visual information on a currently inactive sensing region through the display unit 151.

Figure 12A:
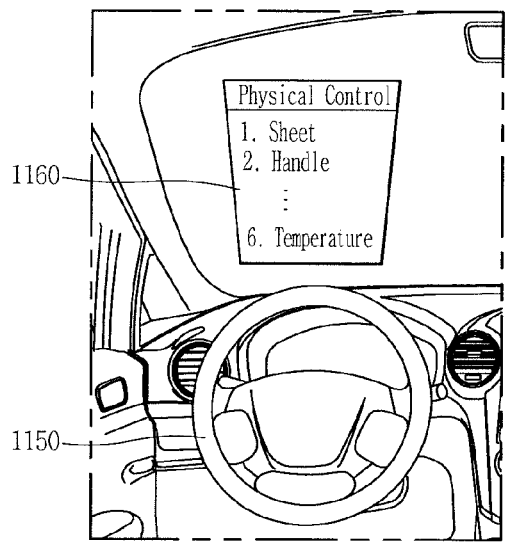
FIGS. 12(a), 12(b) and 12(c) are exemplary views illustrating example in which an active sensing region is switched to an inactive state based on a specific deactivation condition in a vehicle control apparatus according to an embodiment of the present disclosure.
Figure 12B:
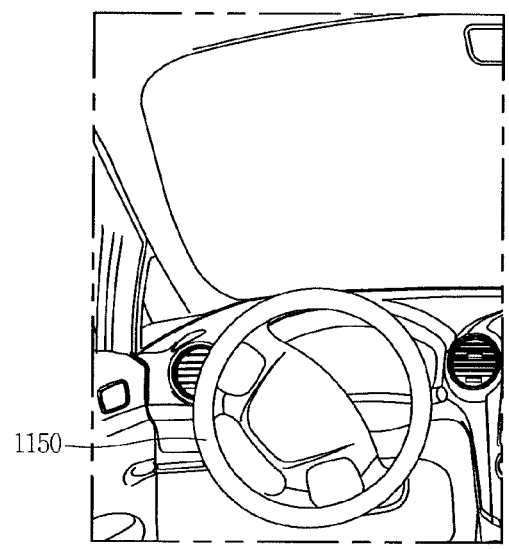
Figure 12C:
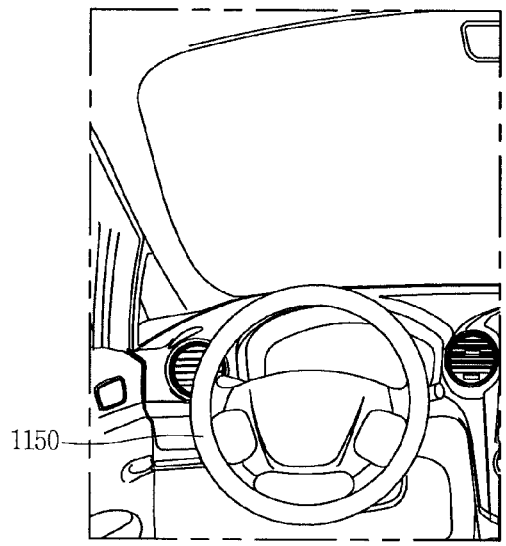

FIGS. 12(*a*), 12(*b*) and 12(*c*) illustrate an example in which an active sensing region is switched to an inactive state based on a specific deactivation condition in a vehicle control apparatus according to an embodiment of the present disclosure.

For example, when a specific sensing region is activated as illustrated in FIG. 12(*a*), the controller 110 may display a menu screen corresponding to the active sensing region to notify that the sensing region is in an active state as illustrated in FIG. 11(*b*). In this case, when a deactivation condition is satisfied for the currently active sensing region, the active sensing region may be switched again to an inactive state.

For example, the deactivation condition of sensing regions formed in the vicinity of the steering wheel may include a case where the vehicle runs on a sharply curved road, a case where the speed of the vehicle is above a predetermined level, and the like. It may be defined to allow the user to concentrate on his or her driving on a sharply curved road or during high-speed driving. In this case, the controller 110 may deactivate sensing regions provided in the steering wheel when the speed of the vehicle is above a predetermined level or the rotation angle of the steering wheel is above a predetermined level as illustrated in FIG. 12(*b*). Furthermore, in this case, the controller 110 may notify it to the user using auditory information and/or visual information through the audio output unit 152 or display unit 151.

In addition, in this case, when the sensing region is deactivated, screen information displayed on the windshield glass 550 may be turned off as illustrated in FIG. 12(*c*). Accordingly, the user may recognize that a current specific sensing region is in an inactive state according to whether or not the screen information is off. Furthermore, in this case, the user may apply a plurality of taps, a touch-and-drawing input or the like again to the sensing region to switch the inactive sensing region to an active state.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 110 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control apparatus, comprising:
a body portion comprising an outer frame forming an external appearance of a vehicle and comprising an inner frame formed to allow a user to enter the vehicle;
a steering wheel mounted in the body portion and formed to be rotatable by a central axis to control a movement direction of the vehicle;
a sensing unit configured to sense a user's input on at least one sensing region formed on at least part of the steering wheel; and
a controller configured to cause the operation of at least one function configured to be executed in the vehicle based on at least one of a location of the at least one sensing region on which the user's input is sensed or the user's input to the at least one sensing region,
wherein the controller is further configured to determine a sensitivity of the sensing unit in sensing the user's input on the at least one sensing region based on a driving state of the vehicle, and
wherein the controller is further configured to:
authenticate a user based on the user's input applied to the at least one sensing region, and
change a status of the vehicle to a lock-released state or a locked.

2. The vehicle control apparatus of claim 1, wherein the controller is further configured to determine, according to the location and a characteristic of the at least one sensing region, whether or not to activate the at least one sensing region based on preset conditions, respectively.

3. The vehicle control apparatus of claim 2, wherein the controller is further configured to deactivate, based on a rotation angle of the steering wheel being greater than a preset threshold angle, one or more sensing regions formed on at least part of the steering wheel.

4. The vehicle control apparatus of claim 1, wherein the steering wheel comprises a circular rotation portion surrounding a central portion thereof configured to be rotated by a user's hands, and wherein sensing regions formed on the steering wheel are formed in one region of the rotation portion to face each other.

5. The vehicle control apparatus of claim 4, wherein the sensing regions further comprise a touch sensor configured to sense a plurality of knocks applied by a user, respectively, or a user's touch and a drawing input applied by the user's touch, and
the controller is further configured to perform a preset function based on a user's input applied to the touch sensor.

6. The vehicle control apparatus of claim 1, wherein the sensing unit further comprises an output unit configured to output notification information, and
the controller is further configured to control the output unit to change an output of the notification information based on an inactive state of the at least one sensing region.

7. The vehicle control apparatus of claim 6, wherein the output unit further comprises a display unit configured to display visual information, and
the controller is further configured to control the display unit to limit the display of the visual information based on the at least one sensing region being switched to an inactive state.

8. The vehicle control apparatus of claim 1, further comprising:
a display unit configured to display visual information, wherein
a sensing region of the at least one sensing region corresponds to a menu screen containing items associated with at least one function of the functions configured to be executed in the vehicle, respectively, and
the controller is further configured to display, on the display unit, a menu screen corresponding to a sensing region among the at least one sensing region on which the user's input is sensed.

9. The vehicle control apparatus of claim 8, wherein the menu screen corresponding to the sensing region among the at least one sensing region on which the user's input is sensed comprises:
at least one item associated with functions for controlling a physical environment setting of the vehicle, or
at least one item associated with functions for controlling a software environment setting of the vehicle.

10. The vehicle control apparatus of claim 8, wherein the controller is further configured to change, based on at least one direction and at least one length of trajectories formed by a user's touch-and-drag input entered on at least two sensing regions at the same time, a size of the visual information displayed on the display unit.

11. The vehicle control apparatus of claim 10, wherein the controller is further configured to:
reduce the size of visual information displayed on the display unit based on at least one length of the trajectories based on the trajectories of the touch-and-drag inputs being formed in directions such that a distance between the trajectories decreases, and
enlarge the size of visual information displayed on the display unit based on at least one length of the trajectories based on the trajectories of the touch-and-drag inputs being formed in directions such that a distance between the trajectories increases.

12. The vehicle control apparatus of claim 8, wherein the display unit is implemented in the form of a transparent display on at least part of a windshield glass of the vehicle.

13. The vehicle control apparatus of claim 1, further comprising:

a driving state determination unit configured to determine the driving state of the vehicle.

14. The vehicle control apparatus of claim 13, wherein the driving state determination unit is further configured to determine a current driving state of the vehicle based on at least one of a vibration generated from the vehicle, a location of the vehicle, or a speed of the vehicle.

15. The vehicle control apparatus of claim 1, wherein the controller is further configured to perform an authentication of a user based on a result of matching, with prestored authentication information:
information indicating recognition of a pattern formed by a plurality of taps applied by the user to the at least one sensing region, or
information received from the user's body.

16. A vehicle control method, the method comprising:
sensing a user's input on at least one sensing region that is formed on a body portion comprising an outer frame and an inner frame of a vehicle;
selecting at least one function configured to be executed in the vehicle based on a location of the at least one sensing region on which the user's input is sensed or the user's input applied to the at least one sensing region; and
cause the operation of the selected at least one function, wherein sensing a user's input further comprises:
activating a sensing region, among the at least one sensing region, on which the user's input is sensed;
determining whether a deactivation condition is satisfied that is associated with the activated sensing region; and
deactivating the activated sensing region based on a determination that the deactivation condition is satisfied, and
wherein the method further comprises:
authenticating a user based on the user's input applied to the at least one sensing region, and
changing a status of the vehicle to a lock-released state or a locked state.

17. The method of claim 16, wherein
the deactivation condition is based on at least one of a location of the activated sensing region or a characteristic of a function of the vehicle that corresponds to the activated sensing region.

18. The method of claim 17, wherein deactivating the activated sensing region based on the sensed result further comprises displaying information associated with the deactivated sensing region.

19. The method of claim 17, wherein activating a sensing region further comprises:
sensing a current driving state of the vehicle; and
determining a sensitivity of the activated sensing region based on the sensed driving state.

20. A vehicle control apparatus, comprising:
a body portion comprising an outer frame forming an external appearance of a vehicle and comprising an inner frame formed to allow a user to enter the vehicle;
a steering wheel mounted in the body portion and formed to be rotatable by a central axis to control a movement direction of the vehicle;
a sensing unit configured to sense a user's input on at least one sensing region formed on at least part of the steering wheel; and
a controller configured to cause the operation of at least one function configured to be executed in the vehicle based on at least one of a location of the at least one sensing region on which the user's input is sensed or the user's input to the at least one sensing region, wherein the controller is further configured to:
- activate a sensing region, among the at least one sensing region, on which the user's input is sensed;
- determine a state of the vehicle; and
- set a sensing mode of the activated sensing region based on the determined state of the vehicle, and wherein the controller is further configured to:
- authenticate a user based on the user's input applied to the at least one sensing region, and
- change a status of the vehicle to a lock-released state or a locked state.

* * * * *